(12) United States Patent
Baghdadi et al.

(10) Patent No.: US 11,433,579 B2
(45) Date of Patent: Sep. 6, 2022

(54) MOLDING SYSTEM AND METHOD

(71) Applicant: NIKE, Inc., Beaverton, OR (US)

(72) Inventors: Hossein A. Baghdadi, Portland, OR (US); Joseph Thomas Muth, North Plains, OR (US); Bradley C. Tutmark, Aloha, OR (US); H. Kenneth Hanson, III, Cincinnati, OH (US); Danny David Lumpkin, Cincinnati, OH (US); Robert L. Ritchie, Warsaw, IN (US); Shawn J. Schnee, Liberty Township, OH (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 16/578,177

(22) Filed: Sep. 20, 2019

(65) Prior Publication Data

US 2020/0094452 A1 Mar. 26, 2020

Related U.S. Application Data

(60) Provisional application No. 62/734,927, filed on Sep. 21, 2018.

(51) Int. Cl.
*B29C 44/36* (2006.01)
(52) U.S. Cl.
CPC .................................... *B29C 44/36* (2013.01)
(58) Field of Classification Search
CPC .............................. B29C 44/36; B29C 44/0492
See application file for complete search history.

(56) References Cited

U.S. PATENT DOCUMENTS

| | | | | |
|---|---|---|---|---|
| 3,966,372 A | * | 6/1976 | Yasuike | B29C 45/1645 264/DIG. 83 |
| 4,067,673 A | * | 1/1978 | Hendry | B29C 44/0492 264/DIG. 83 |
| 5,602,188 A | * | 2/1997 | Nakanishi | C08J 9/125 264/55 |

(Continued)

FOREIGN PATENT DOCUMENTS

| | | |
|---|---|---|
| CN | 106457629 A | 2/2017 |
| EP | 1052078 A1 | 11/2000 |

(Continued)

OTHER PUBLICATIONS

Machine Translation JPH0524063A (Year: 1993).*

(Continued)

*Primary Examiner* — Francisco W Tschen
*Assistant Examiner* — Wayne K. Swier
(74) *Attorney, Agent, or Firm* — Shook, Hardy & Bacon LLP

(57) ABSTRACT

A molding system and a method for operation of the molding system are provided. The method includes flowing a molten polymeric material from an upstream device into an in-mold tuning chamber in a filling position where the in-mold tuning chamber is positioned at least partially within a mold cavity. The method also includes adjusting at least one of a temperature of and a pressure applied to the molten polymeric material in the in-mold tuning chamber to create a first tuned molten polymeric material and releasing the tuned molten polymeric material into the mold cavity from the in-mold tuning chamber.

13 Claims, 9 Drawing Sheets

(56) References Cited

U.S. PATENT DOCUMENTS

| | | | | |
|---|---|---|---|---|
| 5,676,896 | A | * | 10/1997 | Izumida ............ B29C 45/14467 264/293 |
| 6,328,916 | B1 | | 12/2001 | Nishikawa et al. |
| 7,718,110 | B2 | * | 5/2010 | Hoogland ......... B29C 45/14778 264/328.11 |
| 2010/0244318 | A1 | * | 9/2010 | Kobayashi ........ B29C 45/14073 264/279 |
| 2012/0187588 | A1 | * | 7/2012 | Takagi .................. B29D 11/00 425/556 |
| 2017/0043503 | A1 | * | 2/2017 | Suzuki ................. B29B 7/7404 |
| 2018/0215112 | A1 | * | 8/2018 | Gorham ........... B29D 11/00538 |
| 2018/0303587 | A1 | * | 10/2018 | Yamagawa ............ A61K 6/844 |

FOREIGN PATENT DOCUMENTS

| | | | |
|---|---|---|---|
| JP | H0524063 | A | 2/1993 |
| JP | H0524063 | A1 * 2/1993 | ......... B29C 45/1705 |
| JP | 6-254926 | A | 9/1994 |
| JP | H10230528 | A | 9/1998 |
| JP | 2000-141413 | A | 5/2000 |
| JP | 2001277281 | A | 10/2001 |

OTHER PUBLICATIONS

Machine translation CN 106457629A (Year: 2017).*
Machine translation EP1052078a (Year: 2000).*
Machine translation JPH06254926A (Year: 1994).*
Machine translation JP2000141413A (Year: 2000).*
ISA European Patent Office, International Search Report Issued in Application No. PCT/US2019/052289, dated Dec. 9, 2019, WIPO, 4 pages.
ISA European Patent Office, Written Opinion of the International Searching Authority Issued in Application No. PCT/US2019/052289, dated Dec. 9, 2019, WIPO, 7 pages.
International Preliminary Report on Patentability received for PCT Patent Application No. PCT/US2019/052289, dated Apr. 1, 2021, 9 pages.

* cited by examiner

MOLDING SYSTEM AND METHOD

CROSS REFERENCE TO RELATED APPLICATION

The present application claims priority to U.S. Provisional Patent Application No. 62/734,927, entitled "MOLDING SYSTEM AND METHOD", filed on Sep. 21, 2018. The entire contents of the above-listed application are incorporated herein by reference for all purposes.

FIELD

The present description generally relates to systems and methods for molding a polymeric material.

BACKGROUND

Injection molding systems are used to inject polymer melts into molds to form polymer products, goods, parts, etc. Physical blowing agents, such as supercritical fluids (SCFs) (e.g., nitrogen or carbon dioxide), have been employed in certain injection molding processes. Some molding processes, for instance, inject the SCF into a polymer melt in an injection barrel to dissolve the SCF in the polymer melt. In other molding processes, polymer pellets are infused with an SCF prior to the formation of a polymer melt in the injection barrel. Both of these methods produce a molten single phase solution (SPS) of the SCF dissolved in the polymer.

DETAILED DESCRIPTION

Figure 1:
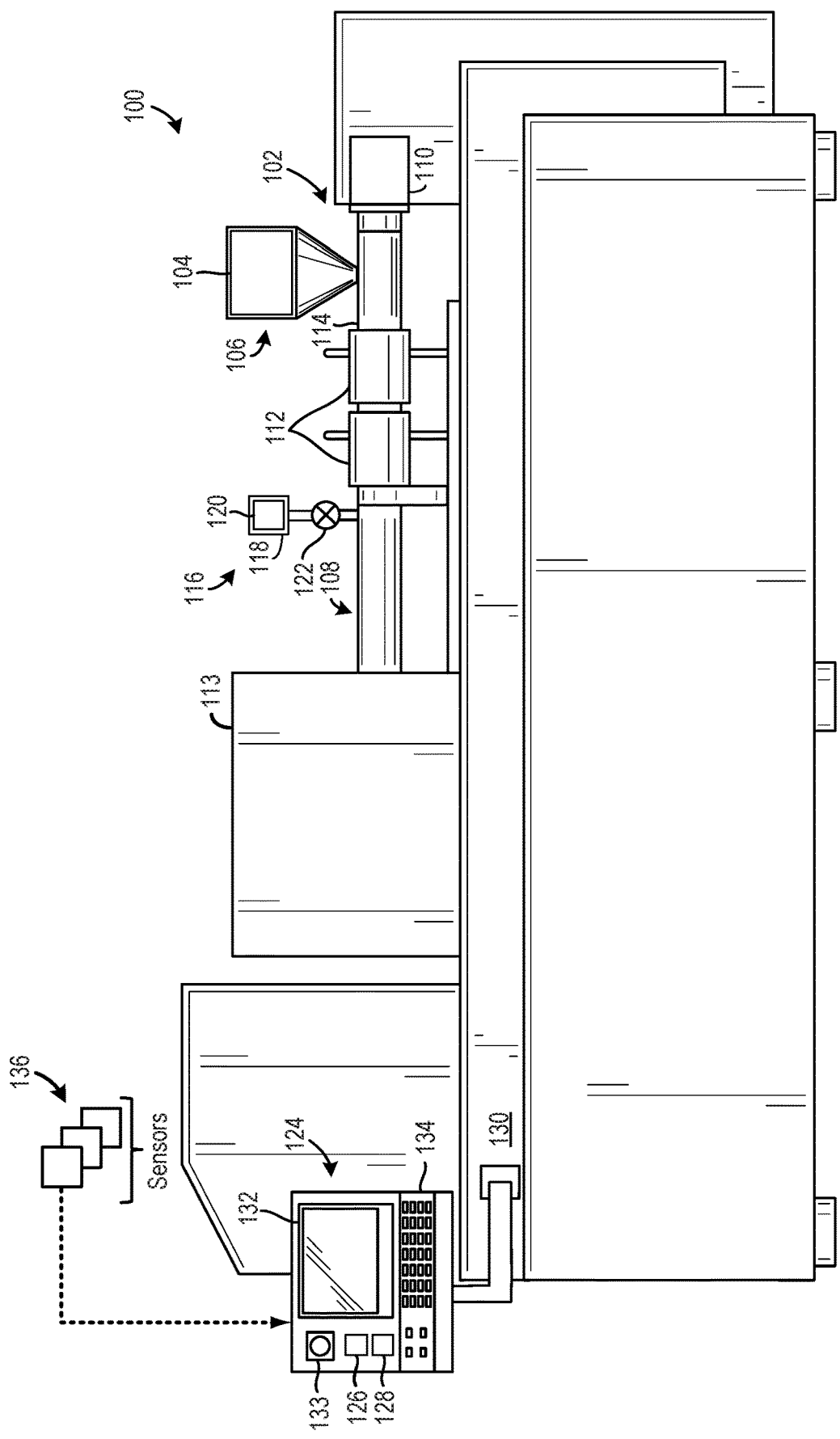
FIG. 1 shows an illustration of a molding system.

Various types of molding techniques, such as microcellular foam injection molding, have been used to manufacture plastic products, goods, components, etc. In microcellular foam injection molding attempts have been made to decrease injection cycle times and product weight. However, in practice previous injection molding systems have fallen short of achieving desired material properties of the molded polymer. Specifically, previous molding systems have suffered from inadequate temperature and pressure control during the molding process. For example, the polymeric material may experience unwanted pressure and temperature changes in intermediary components positioned between the mold and an injection device, such as runners and other conduits designed to route polymeric material into a mold. A host of problems may arise from these control deficiencies including but not limited to unwanted nucleation and/or bubble growth in the polymeric material. Decreases in strength, stiffness, surface quality, as well as inconsistencies in polymer density may occur as a result of the unwanted nucleation and/or bubble growth. The unwanted pressure and temperature changes in the polymeric material also may constrain the choice of source materials used in the molding process, thereby hindering product design choices and specifically the properties of the molded product.

The molding systems and methods described herein overcome at least some of the aforementioned challenges. In one example, a method is provided that includes flowing a molten polymeric material from an upstream device into an in-mold tuning chamber in a filling position where the in-mold tuning chamber is positioned at least partially within a mold cavity. The method also includes adjusting at least one of a temperature of and a pressure applied to the molten polymeric material in the in-mold tuning chamber to create a tuned molten polymeric material and releasing the tuned molten polymeric material into the mold cavity from the in-mold tuning chamber. When temperature and/or pressure tuning of the molten polymeric material takes place inside the mold cavity unexpected and/or unwanted changes in the polymeric material's properties such as shear heating, premature nucleation, etc., may be avoided, losses in the system may be decreased, and precise selection of the molded article's physical and mechanical properties can be achieved. Additionally, tuning the temperature of and/or pressure applied to a molten polymeric material in a sealed volume nested in the mold cavity allows for a wider variety of source material(s) to be selected, if desired, enabling the molding process to be applied to a wide variety of molded articles and manufacturing fields.

In another example, a molding system is provided. The molding system includes, in such an example, an in-mold tuning chamber configured to adjust a temperature of and/or a pressure applied to a molten polymeric material to generate a tuned molten polymeric material. The in-mold tuning chamber is also configured to be arranged in a filling position and a withdrawn position. In the filling position the in-mold tuning chamber is in fluidic communication with an upstream device and is at least partially positioned within a mold cavity. Conversely, in the withdrawn position the in-mold tuning chamber is positioned external to the mold cavity. In this way, the chamber where the molten polymeric material is temperature and/or pressure adjusted is nested within the mold thereby eliminating intermediary conduits (e.g., runners) between the tuning chamber and the mold. Consequently, losses, unwanted material property changes, etc., in the molten polymeric material in intermediary conduits between the tuning chamber and the mold can be avoided, thereby increasing the tunability of the molten polymeric material.

In yet another example, a method for operation of a molding system is provided. In such an example, the method includes actively adjusting a melt strength of a molten polymeric material in an in-mold tuning chamber by applying a controlled pressure to the molten polymeric material and/or actively adjusting a temperature of the molten polymeric material to generate a tuned molten polymeric material. The method also includes releasing the tuned molten polymeric material into a mold cavity from the in-mold tuning chamber. Consequently, the material properties of the molded article can be selected with even more granularity, further increasing the molding method's adaptability and tunability.

FIG. 1 shows an illustration of an example of a molding system 100. Although the molding system 100 illustrated in FIG. 1 is depicted as an apparatus having various parts, components, etc., enclosed therein or coupled thereto. In other embodiments, various components in the molding system 100 may be at least partially housed in different enclosures that may be spaced away from one another.

Moreover, it will be appreciated that the form, profile, etc., of the molding system may be varied, in other embodiments.

The molding system 100 includes a device 102 receiving a polymeric material 104 from a reservoir 106. In the illustrated example, the device 102 is an injection device configured to selectively inject, via a nozzle for instance, molten polymeric material into downstream components. Thus, the molding system may be an injection molding system. However, in other examples, the device may be an extrusion device configured to push polymeric material through a restriction. It will be appreciated that components in the system may be referred to as upstream and downstream components. For instance, the device 102 may be referred to as an upstream device when described with regard to a downstream mold cavity. Likewise, the mold cavity, runners, etc., may be referred to as downstream components with regard to the device 102.

The reservoir 106 is illustrated as a hopper in FIG. 1. However, numerous suitable forms of the reservoir have been contemplated such as conduits, drums, pressurized containers, etc. Additionally, in other examples, the system may include a plurality of reservoirs. Furthermore, the polymeric material 104 may be dried within the reservoir 106 or prior to placement of the material in the reservoir. Moreover, the polymeric material 104 may be in the form of chips, pellets, powders, rods, etc.

The polymeric material 104 includes one or more thermoplastic polymers. The one or more thermoplastic polymers may include a thermoplastic elastomer (TPE). The one or more thermoplastic polymers may include aliphatic polymers, aromatic polymers, or mixture of both. In one example, the one or more thermoplastic polymers may include homopolymers, copolymers (including terpolymers), or mixtures of both. The copolymers may be random copolymers, block copolymers, alternating copolymers, periodic copolymers, or graft copolymers, for instance. The one or more thermoplastic polymers may include olefinic homopolymers or copolymers or a mixture of olefinic homopolymers and copolymers. Examples of olefinic polymers include polyethylene (PE) and polypropylene (PP). For example, the PE may be a PE homopolymer such as a low density PE or a high density PE, a low molecular weight PE or an ultra-high molecular weight PE, a linear PE or a branched chain PE, etc. The PE may be an ethylene copolymer such as, for example, an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, etc. The one or more thermoplastic polymers may include a polyacrylate such as a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, etc., including derivatives thereof, copolymers thereof, and any mixture thereof, in one example. The one or more thermoplastic polymers may include an ionomeric polymer. The ionomeric polymer may be a polycarboxylic acid or a derivative of a polycarboxylic acid, for instance. The ionomeric polymer may be a sodium salt, a magnesium salt, a potassium salt, or a salt of another metallic ion. The ionomeric polymer may be a fatty acid modified ionomeric polymer. Examples of ionomeric polymers include polystyrene sulfonate, and ethylene-methacrylic acid copolymers. The one or more thermoplastic polymers may include a polycarbonate. The one or more thermoplastic polymers may include a fluoropolymer. The one or more thermoplastic polymers may include a polysiloxane. The one or more thermoplastic polymers may include a vinyl polymer such as polyvinyl chloride (PVC), polyvinyl acetate, polyvinyl alcohol, etc. The one or more thermoplastic polymers may include a polystyrene. The polystyrene may be a styrene copolymer such as, for example, an acrylonitrile butadiene styrene (ABS), a styrene acrylonitrile (SAN), a styrene ethylene butylene styrene (SEBS), a styrene ethylene propylene styrene (SEPS), a styrene butadiene styrene (SBS), etc. The one or more thermoplastic polymers may include a polyamide (PA). The PA may be a PA 6, PA 66, PA 11, or a copolymer thereof. The polyester may be an aliphatic polyester homopolymer or copolymer such as polyglycolic acid, polylactic acid, polycaprolactone, polyhydroxybutyrate, and the like. The polyester may be a semi-aromatic copolymer such as polyethylene terephthalate (PET) or polybutylene terephthalate (PBT). The one or more thermoplastic polymers may include a polyether such as a polyethylene glycol or polypropylene glycol, including copolymers thereof. The one or more thermoplastic polymers may include a polyurethane, including an aromatic polyurethane derived from an aromatic isocyanate such as diphenylmethane diisocyanate (MDI) or toluene diisocyanate (TDI), or an aliphatic polyurethane derived from an aliphatic isocyanate such as hexamethylene diisocyanate (HDI) or isophone diisocyanate (IPDI), or a mixture of both an aromatic polyurethane and an aliphatic polyurethane.

In addition to the one or more thermoplastic polymers, the polymeric material 104 may further include a chemical blowing agent that forms a gas when heated. For example, the chemical blowing agent can be an azo compound such as adodicarbonamide, sodium bicarbonate, or an isocyanate. Optionally, in addition to the one or more thermoplastic polymers, the polymeric material 104 may further include a crosslinking agent. The crosslinking agent can be a peroxide-based crosslinking agent such as dicumyl peroxide. Optionally, in addition to the one or more thermoplastic polymers, the polymeric material 104 may further include one or more fillers such as glass fiber, powdered glass, modified or natural silica, calcium carbonate, mica, paper, wood chips, modified or natural clays, modified or unmodified synthetic clays, talc, etc.

Specifically, in one example, the polymeric material 104 may include EVA and/or thermoplastic polyurethane (TPU) and the molding system 100 may create a molded footwear component (e.g., upper, midsole, and/or outsole). However, the molding system 100 and processes described herein have far-reaching applicability to fields beyond the footwear industry such as the automotive industry, aerospace industry, packaging industry, sporting goods industry, etc. Therefore, the molding system may be designed to manufacture a wide variety of articles in any of the aforementioned fields. As described herein, an article may be any good, product, component, item, part, etc., used in any of the aforementioned industries or other suitable industries, fields, etc.

The device 102 shown in FIG. 1 includes a barrel 108 and a drive device 110 designed to adjust (e.g., rotate and/or advance and retract) a screw housed in the barrel. For instance, the drive device may include a motor (e.g., electric motor) which rotates and/or axially moves a shaft coupled to the screw. The device 102 is configured to provide molten polymeric material to downstream components 113 such as an in-mold tuning chamber and a mold.

Heating devices 112 are also coupled to the barrel 108 and designed to heat the polymeric material in the barrel 108 to form a molten polymeric material. Specifically, the heating devices 112 are coupled to an exterior surface 114 of the barrel 108 and circumferentially surround the barrel. However, alternate configurations of the heating devices 112 have been contemplated, such as heating devices that partially surround the barrel and/or heating devices that are integrated into the barrel. The heating devices 112 may include electric heating components, hydraulic heating components, etc. The heating devices 112 may therefore include heat exchangers, resistance heaters, heat pumps, etc., that may be controlled by a computing device 124, shown in FIG. 1, based on operating conditions (e.g., ambient temperature, barrel temperature, barrel pressure, etc.). The heating devices 112, in other examples, may be positioned in other suitable locations in the system, such as the reservoir 106.

The molding system 100 may also include a blowing agent delivery assembly 116 configured to flow a blowing agent, color, etc., into the barrel 108. In one example, the blowing agent delivery assembly may be designed to inject a blowing agent into the barrel 108 through a port. However, other suitable types of blowing agent delivery assemblies have been contemplated. For instance, the blowing agent delivery assembly 116 may be integrated into the reservoir 106, may be positioned upstream of the reservoir 106, or may not be included in the system. If the blowing agent delivery assembly 116 is integrated into the reservoir 106 or is positioned upstream thereof, the reservoir may include a solid polymeric material and a blowing agent. In one example, the blowing agent may be included in the polymeric material.

The blowing agent delivery assembly 116 includes a blowing agent storage device 118 storing a blowing agent 120. The blowing agent may include a physical blowing agent and/or a chemical blowing agent, in some examples. Specifically, the blowing agent may include nitrogen and/or carbon dioxide, in some examples. However, other suitable blowing agents may be used such as hydrocarbons (e.g., pentane, isopentane, and/or cyclopentane), hydrochlorofluorocarbons (HCFCs), mixtures thereof, etc. Furthermore, the blowing agent stored in the blowing agent storage device 118 may be stored and/or flowed into the barrel 108 as an SCF. For instance, supercritical nitrogen and/or supercritical carbon dioxide may be flowed into the barrel. However, in other examples, the blowing agent may be flowed into the barrel as a gas and/or fluid and the conditions in the barrel may enable the blowing agent to achieve a supercritical state. Further, in other examples, when the blowing agent includes two substances, such as nitrogen and carbon dioxide, the blowing agent delivery assembly may include one port delivering a first substance (e.g., nitrogen) into the barrel and another port delivering a second substance (e.g., carbon dioxide) into the barrel. However, one port that delivers both substances may be used, in other instances.

The blowing agent delivery assembly 116 also include a blowing agent valve 122 coupled to the barrel 108. The blowing agent valve 122 is designed to adjust the amount of blowing agent flowing into the barrel 108. For instance, the blowing agent valve 122 may be opened/closed to allow the blowing agent to be flowed into the barrel during certain operating conditions and to prevent the blowing agent from flowing into the barrel during other operating conditions. Moreover, the blowing agent valve 122 may have a plurality of different open positions allowing the flowrate of the blowing agent delivered to the barrel 108 to be adjusted. When the blowing agent is delivered to the barrel 108 a molten SPS may be formed therein. The molten SPS may therefore include the molten polymeric material and the blowing agent dissolved therein, in one example.

FIG. 1 shows the computing device 124 included in the molding system 100. It will be appreciated that the computing device 124 may be a controller designed to adjust various aspects of the molding process. The computing device 124 includes memory 126 and a processor 128. Instructions may be stored in the memory which are executable by the processor to perform the methods, control strategies, etc., described herein. The memory 126 may include volatile, nonvolatile, non-transitory, dynamic, static, read/write, read-only, random-access, sequential-access, location-addressable, file-addressable, and/or content-addressable devices. Additionally, the processor 128 may be a single-core or multi-core device, and the instructions executed thereon may be configured for sequential, parallel, and/or distributed processing. Although the computing device 124 is shown directly coupled an external housing 130 of the system, the computing device 124 may be remotely located, in other instances. Furthermore, the computing device 124 may be electronically (e.g., wired and/or wirelessly) connected to the device 102 and/or other components in the system.

The computing device 124 may also include a display device 132. The display device 132 may be used to present visual representations of data held by the memory 126. The graphics presented on the display device 132 may take the form of a graphical user interface (GUI) or other suitable interfaces, for instance. The computing device 124 also includes an input device 134. In the illustrated example, the input device 134 is in the form of a keyboard. The input device may additionally or alternatively include a mouse, joystick, camera, microphone, touchscreen, etc. Thus, user input may be used to adjust different aspects of the molding process, in some examples. Additionally or alternatively, automated instructions may trigger changes in the molding process. Furthermore, the display device and/or the input device may be omitted from the computing device, in other embodiments.

The computing device 124 may also include a condition indicator 133 which may indicate that the molding system 100 has reached one or more desired operating condition(s) (e.g., tuning chamber pressure and/or temperature set-points, mold temperature set-points, mold counter pressure set-points, combinations thereof, etc.). Thus, the condition indicator 133 may indicate to a system operator that a desired condition has been achieved such as a desired tuning chamber pressure or temperature, discussed in detail herein. Responsive to the triggering of the condition indicator, the system operator may command the system to take a desired action via the input device 134, such as commanding the in-mold tuning chamber to release a tuned molten polymeric material (e.g., tuned molten SPS) held therein into the mold cavity. The condition indicator 133 may include audio, graphical, and/or haptic components for alerting the system operator. The graphical indicator may be a graphic presented on the display device and/or may include one or more light(s) for signaling the operator. In this way, certain aspects of the molding process may be manually controlled. However, in other examples, more automated control strategies may be utilized.

Sensors 136 may also provide signals to the computing device 124. The sensors may include temperature sensors, pressure sensors, etc. The sensors may be attached to or integrated into the device 102 and/or downstream components, described in more detail herein with regard to FIGS. 2-4. For instance, the device 102 may include temperature sensor(s), pressure sensor(s), and/or combined temperature—pressure senor(s) sending signals to the computing device 124. The sensors enable temperatures and pressures in selected sections of the system to be determined.

Figure 2:
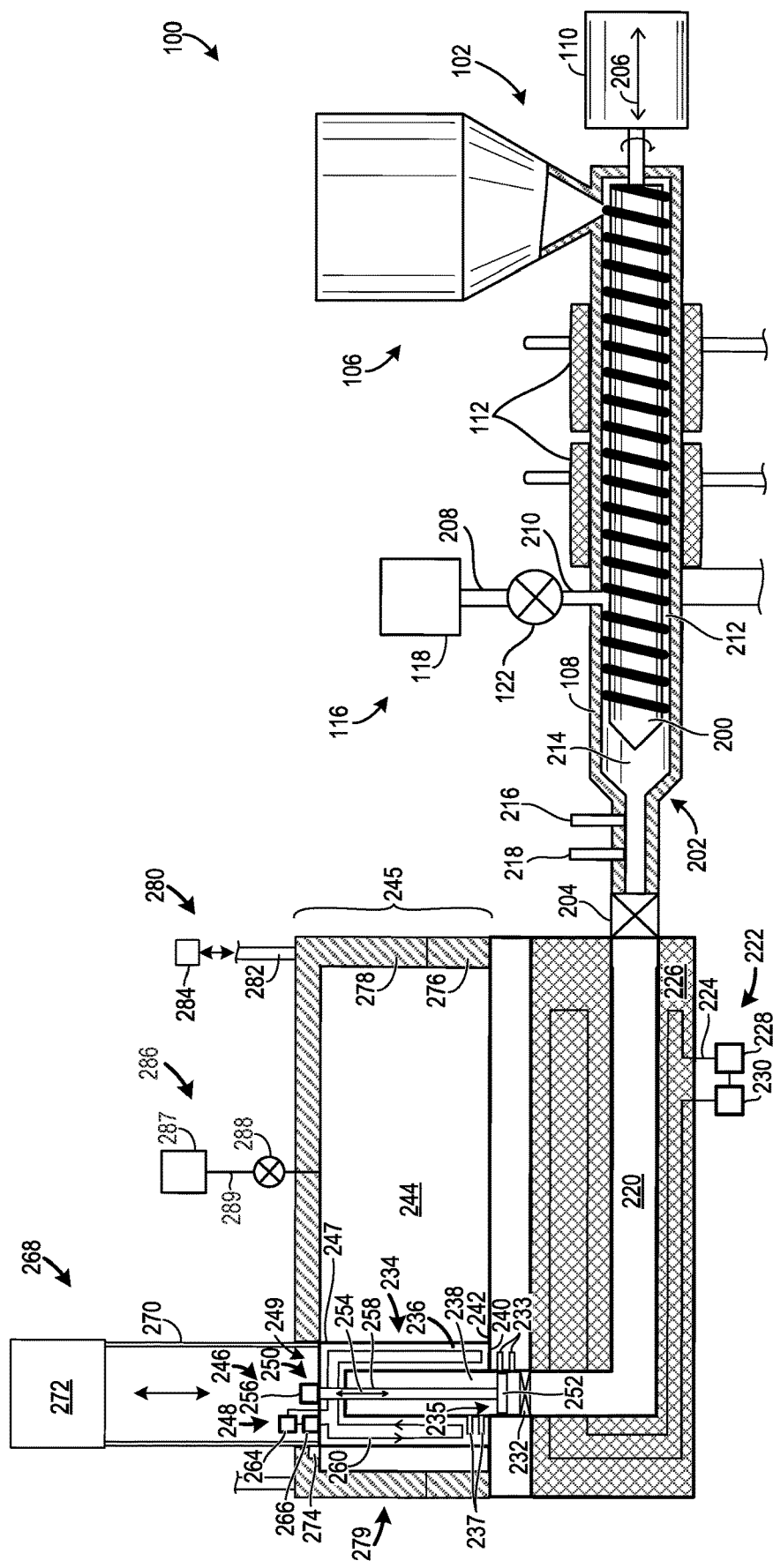
FIGS. 2-4 show a molding sequence for molding an article using the molding system, shown in FIG. 1.
Figure 3:
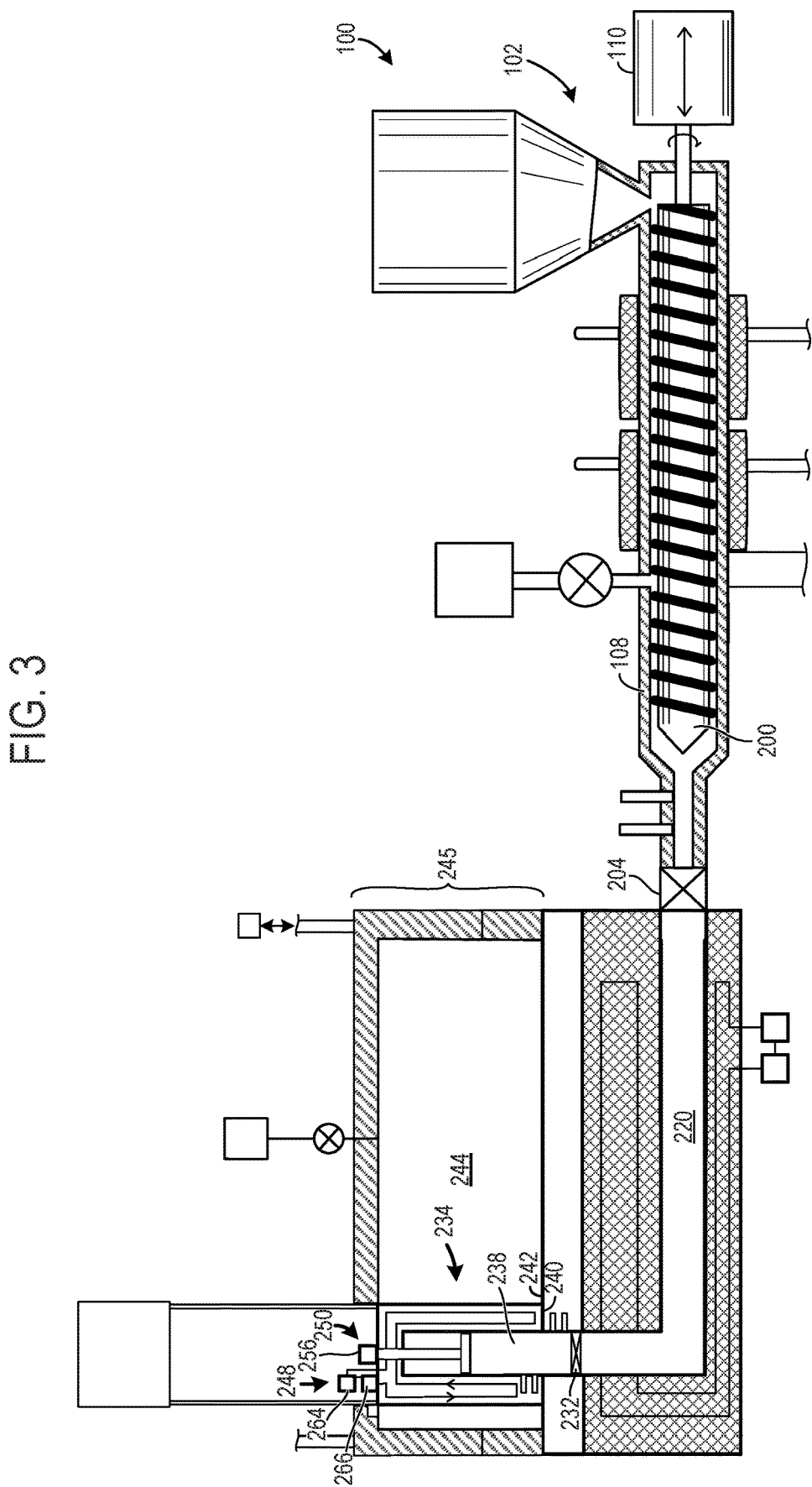
Figure 4:
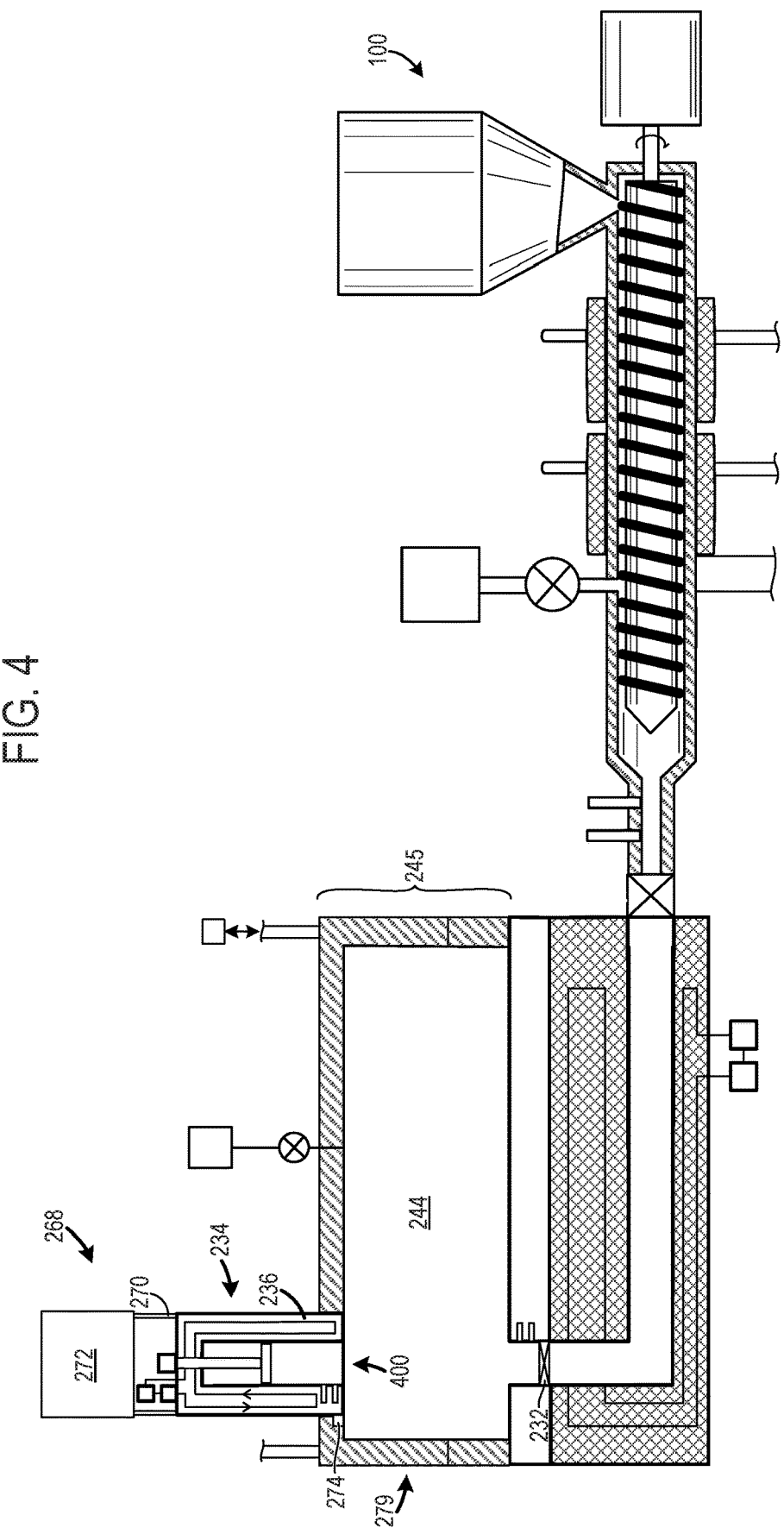

The computing device 124 also sends and receives signals from the device 102, drive device 110, the heating devices 112, and the blowing agent valve 122 as well as a barrel valve 204, gate valve 232, runner temperature adjustment device 222 (e.g., pump 228 and heat exchanger 230), polymeric material tuning assembly 246 (e.g., temperature adjustment mechanism 248 (e.g., pump 264 and/or heat exchanger 266) and pressure adjustment mechanism 250 (e.g., piston actuator)), chamber retraction device 268 (e.g., actuator 272), and mold actuation device 280 (e.g., clamping device 284), shown in FIGS. 2-4 and discussed in greater detail herein. The aforementioned devices, mechanisms, valves, assemblies, etc., may include actuators facilitating adjustment of the devices, mechanisms, valves, assemblies, etc. For instance, the blowing agent valve 122 may include a valve actuator adjusting the degree of opening/closing of the valve. It will be appreciated, that the other devices, mechanisms, valves, assemblies, etc., may also include actuators functioning in a similar manner to allow adjustment of the device, mechanism, valve, assembly, etc.

FIGS. 2-4 show a detailed view of the molding system 100. In particular, sequential steps in a molding process are illustrated in FIGS. 2-4. The computing device 124, shown in FIG. 1, may control the molding steps illustrated in FIGS. 2-4. As such, the computing device 124 may send and receive signals to/from various components in the molding system 100, shown in FIGS. 2-4.

Turning specifically to FIG. 2, a cross-sectional view of the device 102 is depicted. The device 102 includes the barrel 108 at least partially enclosing a screw 200. The reservoir 106 is again shown coupled to the barrel 108 and provides polymeric material thereto.

The drive device 110 (e.g., drive motor) is coupled to the screw 200. The drive device 110 is designed to rotate the screw 200 and/or advance and retract the screw in the barrel 108. Rotation of the screw causes the polymeric material to flow downstream through the barrel, and advancing the screw in the barrel towards a nozzle 202 increases the pressure applied to the molten polymeric material in front of the screw. The molten polymeric material may therefore flow out of the barrel when a barrel valve 204 is opened. The axis 206 about which the screw rotates and advances/retracts is provided, for reference. In other examples, separate actuators may be used to rotate and advance/retract the screw.

As the polymeric material moves through the barrel 108, the polymeric material may be heated via the heating devices 112 coupled to the barrel 108. It will be appreciated that the heating devices 112 may increase the temperature of the barrel 108 and in turn increase the temperature of the polymeric material. As such, a molten polymeric material may be formed in the barrel after the polymeric material is heated. As previously mentioned, the heating devices may be controlled by the computing device 124, shown in FIG. 1.

The blowing agent delivery assembly 116 is also shown in FIG. 2. The blowing agent delivery assembly 116 includes the blowing agent storage device 118 and the blowing agent valve 122, as previously discussed. A blowing agent conduit 208 may extend between the blowing agent valve 122 and blowing agent storage device 118. Another blowing agent conduit 210 may extend between the blowing agent valve 122 and the barrel 108. Specifically, in the illustrated example, the blowing agent conduit 210 opens into an interior section 212 of the barrel 108 having the screw 200 housed therein. However, numerous suitable blowing agent delivery assembly configurations have been envisioned. For instance, the blowing agent valve 122 may be integrated into the barrel 108. As previously discussed, when the blowing agent is flowed into the molten polymeric material in the barrel, a molten SPS may be formed. As such, the molten SPS may include the molten polymeric material having a blowing agent dissolved therein. However, in other examples, the SPS may be created upstream of the barrel 108.

A section 214 of the barrel 108 downstream of the screw 200 accumulates the molten polymeric material during operation of the device 102. Specifically, in one example, the section 214 of the barrel may accumulate the molten SPS. As previously discussed, the section 214 of the barrel 108 may retain the molten polymeric material. In the illustrated example, a pressure sensor 216 and a temperature sensor 218 are shown coupled to the barrel 108 downstream of the screw 200 and are in electronic communication with the computing device 124, shown in FIG. 1. However, in other examples, additional or alternative suitable sensor positions have been contemplated, such as at upstream locations adjacent to the screw. Further, in other examples, a single sensor may be used to measure both temperature and pressure or the sensors may be omitted from the system.

The barrel 108 includes the nozzle 202 and in the illustrated example, the barrel valve 204. The barrel valve 204 may be configured to adjust the flowrate of molten polymeric material from the barrel 108 into a runner 220 coupled to the barrel 108. The barrel valve 204 may be opened and closed via control signals from the computing device 124, shown in FIG. 1, to regulate the flow of molten polymeric material from the barrel 108 to downstream components. For instance, the barrel valve 204 may be opened when pressure and/or temperature set-point(s) in the barrel are achieved. However, in other examples, the barrel valve may be omitted from the molding system 100.

The runner 220 may receive the molten polymeric material from the barrel 108 when the barrel valve 204 is open. A runner temperature adjustment device 222 configured to adjust the temperature of the molten polymeric material flowing through the runner 220 is also included in the molding system 100. However, in other examples, the runner temperature adjustment device 222 may be omitted from the system.

The runner temperature adjustment device 222 includes a fluid loop 224 (e.g., coolant loop) traversing a runner housing 226 and a pump 228 adjusting fluid flow through the loop. Thus, it will be appreciated that during operation of the runner temperature adjustment device 222 fluid may be circulated through the fluid loop 224. Additionally, the runner temperature adjustment device 222 includes a heat exchanger 230 adding and/or removing heat to/from the fluid flowing there through. Consequently, the temperature of the molten polymeric material flowing through the runner may be increased and/or decreased, if desired. Additionally or alternatively, electric heating and/or cooling components and/or other suitable components may be used in the temperature adjustment device.

The heat exchanger 230 and/or the other heat exchangers, described herein, may include components such as coolant conduits, counter-flow assemblies, fins, coils, etc., to enable heat to be transferred to or removed from the working fluid in the fluid loop 224. Furthermore, the heat exchanger configurations may vary between heat exchangers to achieve desired amounts of heating/cooling, in one example, while in other examples the heat exchangers may have similar designs. The pump 228 and/or the other pumps described herein may include components such as plungers, pumping cavities, seals, vanes, etc., allowing pumping action to be carried out. For example, the pumps may be positive displacement pumps, centrifugal pumps, etc. The configuration of the pumps may vary between the pumps to achieve desired fluid flowrates, in one example, while in other examples the pumps may have similar designs.

The gate valve 232 may be included in the runner 220. Specifically, in the illustrated example, the gate valve 232 is positioned upstream of an outlet 235 of the runner 220. However, in other examples, the gate valve 232 may be omitted from the molding system 100 or may be positioned in other suitable locations. The gate valve 232 is designed to permit and inhibit molten polymeric material flow there through. Additionally, sensors 233 may be coupled to the runner 220 downstream of the gate valve 232. However, in other examples, the sensors 233 may be positioned upstream of the gate valve 232. Additionally, the sensors 233 may include a temperature and/or pressure sensor. However, in other examples, a single sensor may be designed to sense both temperature and pressure or the sensors may be omitted from the system and the temperature and/or pressure may be inferred from other sensors and/or system configurations. The gate valve 232 may receive control signals from the computing device 124, shown in FIG. 1, to control operation thereof. For instance, the computing device may instruct the gate valve to be opened while downstream components are filled with molten polymeric material and closed subsequent to filling operation.

An in-mold tuning chamber 234 is also included in the molding system 100. The in-mold tuning chamber 234 includes a chamber housing 236 and an interior cavity 238. The in-mold tuning chamber 234 is shown in a filling position where a lip 240 of the chamber housing 236 is engaged (e.g., sealed) with an interior wall 242 of a mold cavity 244 of a mold 245. Thus, in the filling position the in-mold tuning chamber 234 and specifically the interior cavity 238 may be in fluidic communication with the runner 220 and may be fluidly separated from the remainder of the mold cavity 244. In this way, the molten polymeric material can be held within the in-mold tuning chamber while pressure and/or temperature adjustments are carried out. Moreover, in the filling position an outer surface 247 of the chamber housing 236 may be at least partially enclosed (e.g., fully enclosed) by a mold housing 279. Moreover, the chamber housing 236 may extend across an opening 249 in the mold housing 279 in the filling position.

Sensors 237 are shown coupled to the in-mold tuning chamber 234 and may include a temperature sensor and a pressure sensor. However, in other examples, a single sensor may sense temperature and pressure in the tuning chamber or the sensors may not be included in the system. It will also be appreciated that the in-mold tuning chamber 234 may have a circular cross-sectional profile, in one example. However, numerous cross-sectional profiles have been contemplated such as an oval profile, a square profile, or a profile with distinct regions. For instance, baffles may extend across the interior of the in-mold tuning chamber to divide the chamber into fluidly separated sections. However, a variety of tuning chamber profiles have been contemplated.

A polymeric material tuning assembly 246 is coupled to the in-mold tuning chamber 234. The polymeric material tuning assembly 246 is designed to adjust a temperature of and/or pressure applied to the molten polymeric material in the in-mold tuning chamber 234. For instance, a temperature of the molten polymeric material may be increased when the computing device determines that the molten polymeric material is below a desired temperature or a pressure applied to the molten polymeric material may be increased when it is determined that a pressure applied to the molten polymeric material is below a threshold value. It will be appreciated that numerous control strategies have been envisioned. A pressure and/or temperature adjustment may occur when the temperature of the molten polymeric material and/or the pressure applied to the molten polymeric material increases or decreases by threshold amounts, for instance. The temperature threshold may be 0.0001° C., 0.001° C., 0.5° C., etc. The pressure threshold may be 0.0001 kPa, 0.001 kPa, 0.1 kPa, etc. It will be appreciated that the aforementioned thresholds are provided by way of example and that numerous thresholds may be used.

The polymeric material tuning assembly 246 includes a temperature adjustment mechanism 248 and a pressure adjustment mechanism 250, in the illustrated example. However, in other examples, the assembly may only include one of the temperature and pressure adjustment mechanisms.

The pressure adjustment mechanism 250 includes a piston 252 disposed in the interior cavity 238 in the in-mold tuning chamber 234. Specifically, the piston 252 may extend across a width of the chamber and may be moved in opposing directions along axis 254 via a piston actuator 256 coupled to the piston via a stem 258. The piston actuator 256 may include hydraulic devices, electronic devices, etc., that move the stem and piston in opposing axial directions. In this way, the volume of the interior cavity 238 may be changed to alter the pressure applied to the molten polymeric material therein. The computing device 124, shown in FIG. 1, may send command signals to the pressure adjustment mechanism 250 and specifically the piston actuator 256 to extend and retract the piston 252. For instance, the piston may be retracted to fill the tuning chamber with the molten polymeric material and extended after the tuning chamber is returned to the mold cavity during a subsequent molding cycle.

In the example, shown in FIG. 2, the piston 252 extends into the runner 220. In this way, the piston 252 may also act to vary the pressure applied to the molten polymeric material in the runner 220. Thus, the piston may be retracted to introduce molten polymeric material into the in-mold tuning chamber 234. However, in other instances, the piston 252 may not be designed to extend beyond the interior wall 242 of the mold cavity 244. In such an example, the gate valve 232 may be positioned in the outlet 235 of the runner 220.

The temperature adjustment mechanism 248 includes a fluid loop 260 (e.g., coolant loop) traversing the chamber housing 236 of the in-mold tuning chamber 234. Additionally or alternatively, the fluid loop 260 may traverse a section of the piston 252, thereby increasing the area of the tuning chamber that may be heated and/or cooled. A pump 264 generating and/or adjusting fluid (e.g., coolant) flow through the fluid loop 260 is also included in the temperature adjustment mechanism 248. To alter fluid heating or cooling the pump output may be varied to vary the flowrate of the fluid travelling through the fluid loop. A heat exchanger 266 increasing or decreasing the temperature of the fluid flowing there through is also included in the temperature adjustment mechanism 248. Additionally or alternatively electric heating and/or cooling devices (e.g., Peltier devices, resistance heaters, etc.) may be included in the temperature adjustment mechanism 248. In other examples, heat rods may, additionally or alternatively, be used to increase the temperature of the molten polymeric material.

The computing device 124, shown in FIG. 1, may send command signals to the temperature adjustment mechanism 248 and specifically the pump 264 and/or heat exchanger 266 to alter the amount of heat transferred to or removed from the molten polymeric material in the in-mold tuning chamber 234. For example, the pump's output may be increased to increase molten polymeric material cooling when the molten polymeric material's temperature is above a desirable value. In this way, the molten polymeric material tuning assembly 246 and specifically, the pressure adjustment mechanism 250 and the temperature adjustment mechanism 248, may be commanded by the computing device to increase/decrease the temperature of and/or the pressure applied to the molten polymeric material in the in-mold tuning chamber 234 and/or at the outlet 235 of the runner 220. The temperature and pressure adjustment commands may be chosen based on set-points that allow the molten polymeric material to achieve targeted physical and mechanical properties. As a result, the molded article's characteristics can be modified based on the end-use goals of the molded article. In this way, the article's characteristics may be chosen to match design objectives, if desired.

The position of the in-mold tuning chamber 234 may be adjusted by a chamber retraction device 268. In particular, the chamber retraction device 268 is designed to place the in-mold tuning chamber 234 in the filling position, shown in FIG. 2, and in a withdrawn position, shown in FIG. 4, discussed in greater detail herein. Thus, the in-mold tuning chamber 234 is removable from the mold cavity. It will also be appreciated that the chamber retraction device 268 is configured to establish and break a seal between the in-mold tuning chamber and an interior surface of the mold.

In the illustrated example, the chamber retraction device 268 includes rods 270 coupled to the chamber housing 236 and an actuator 272 (e.g., motor, piston (e.g., hydraulic piston, pneumatic piston, etc.), etc.). However, other suitable chamber retraction device configurations have been contemplated. The actuator 272 is designed to extend and retract the rods 270 and therefore move the chamber housing 236 into and out of the mold cavity 244. Thus, the chamber housing 236 may be moved in opposing directions to place the in-mold tuning chamber 234 inside and outside the mold cavity 244. Specifically, the chamber retraction device 268 and specifically the actuator 272 may be commanded by the computing device 124, shown in FIG. 1, to seal the in-mold tuning chamber 234 against the interior wall 242 of the mold cavity 244, break said seal, as well as remove the chamber from the mold. Consequently, the in-mold tuning chamber 234 may be filled with a molten polymeric material from upstream components while it is in the mold and then subsequently released to induce foaming of the molten polymeric material in the mold.

Continuing with FIG. 2, the chamber retraction device 268 may also include the sealing mechanism 274 designed to seal the mold cavity 244 when the in-mold tuning chamber 234 is removed from the mold cavity 244. The sealing mechanism 274 may receive control signals from the computing device 124, shown in FIG. 1. The sealing mechanism 274 reduces the likelihood of (e.g., prevent) polymeric material escaping from the mold. The sealing mechanism 274 may include suitable mechanisms such as seals, housings, shafts, pivots, pistons, combinations thereof, etc., to allow the sealing functionality to be accomplished.

As illustrated in FIG. 2, the mold 245 includes two sections (i.e., a first section 276 and a second section 278). The sections are included in the mold housing 279. The mold 245 may be clamped and unclamped via the mold actuation device 280. The mold actuation device 280 may include tie rods 282 attached to a clamping device 284 (e.g., clamping cylinder) as well as mechanisms such as motors, pistons (e.g., hydraulic and/or pneumatic), gears, etc., to enable clamping/unclamping action of the mold. As shown, the tie rods 282 are attached to the second section 278 of the mold 245. The tie rods 282 and clamping device 284 enable the mold to be opened once the article has been formed and/or cooled in the mold. Thus, the first section 276 and the second section 278 may be clamped and then unclamped such that the sections are spaced away from one another. However, other suitable mold configurations have been contemplated. The mold actuation device 280 may receive control signals from the computing device 124, shown in FIG. 1, to open and close the mold during a molding cycle.

The molding system 100 may also include a gas counter pressure (GCP) assembly 286 configured to adjust (e.g., increase and/or decrease) the pressure in the mold 245 prior to, during, and/or after the flow of the molten polymeric material into the mold cavity 244. The GCP assembly 286 includes a gas reservoir 287 storing a pressurized gas. The gas may be air and/or nitrogen, in some examples. The GCP assembly 286 further includes a counter pressure valve 288 commanded by the computing device 124. The counter pressure valve 288 regulates the amount of gas flowed into the mold cavity 242 via a line 289 extending between the gas reservoir 254 and the mold cavity 244. The valve 288 may also function to adjust the release rate of the pressurized gas from the mold cavity 244. However, in other examples, a separate valve may control the release rate of the pressurized gas from the mold cavity.

FIG. 3 shows a stage in a molding process where the molten polymeric material is flowed into the in-mold tuning chamber 234 while the chamber is in the filling position. As previously mentioned, in the filling position, the lip 240 is in sealing engagement with the interior wall 242 of the mold cavity 244 of the mold 245. Thus, the interior cavity 238 of the in-mold tuning chamber 234 is sealed from the remainder of the mold cavity 244. Moreover, it will be appreciated that in the filling position the in-mold tuning chamber 234 is in direct fluidic communication with the runner 220. However, other tuning chamber filling configurations have been contemplated.

Additionally in the molding stage illustrated in FIG. 3, the piston 252 in the pressure adjustment mechanism 250 is retracted into the in-mold tuning chamber 234 via operation of the piston actuator 256 commanded by the computing device 124, shown in FIG. 1, for example. Changing the volume of the in-mold tuning chamber 234 via piston adjustment allows the molten polymeric material to be introduced into the in-mold tuning chamber 234 at desired pressures and flowrates. In this way, the molten polymeric material's properties may be precisely controlled to reduce the likelihood of undesired (e.g., premature) nucleation in the molten polymeric material.

Additionally, in the device 102 the screw 200 may be advanced in the barrel 108 to induce molten polymeric material flow through the runner 220 and into the in-mold tuning chamber 234. The screw movement may be initiated via drive device 110. Moreover, it will be appreciated that barrel valve 204 may be opened to allow molten polymeric material to flow from the device 102 into the runner 220 and then the in-mold tuning chamber 234. The gate valve 232 may also be opened while the molten polymeric material is flowed into the in-mold tuning chamber 234 and then subsequently closed to enable temperature and/or pressure adjustments in the tuning chamber.

Additionally, in one example, the temperature adjustment mechanism 248 may also be controlled by the computing device 124, shown in FIG. 1, to adjust the temperature of the molten polymeric material contained in the in-mold tuning chamber 234. For example, the temperature of the molten polymeric material in the in-mold tuning chamber 234 may be increased or decreased until the molten polymeric material reaches a temperature set-point or desired temperature range. For instance, the output of the pump 264 and/or the configuration of the heat exchanger 266 may be adjusted to heat or cool the molten polymeric material in the tuning chamber. Moreover, the pressure and temperature adjustments may be carried out during overlapping durations, in one example, or in other examples, may be implemented at non-overlapping durations. Additionally, it will be appreciated that the gate valve 232 may be closed while the temperature and/or pressure adjustments of the molten polymeric material in the in-mold tuning chamber 234 are carried out.

The runner temperature adjustment device 222 may also be adjusted to heat or cool the molten polymeric material while it is introduced into the in-mold tuning chamber 234 from the runner 220. For instance, the temperature of the molten polymeric material in the runner 220 may be increased or decreased to keep the molten polymeric material at a desired temperature or within a desired temperature range as it flows into the in-mold tuning chamber 234.

Furthermore, in some instances, the in-mold tuning chamber 234 may be filled with molten polymeric material in sequential stages. As such, the in-mold tuning chamber 234 may have differently tuned layers and/or layers with different types of polymeric material.

In a first example, during a first stage, a polymeric material tuned via a first scheme (e.g., temperature and/or pressure adjusted by a first amount) may be flowed into the in-mold tuning chamber 234. Continuing with the first example, during a second stage, a polymeric material tuned via a second scheme (e.g., temperature and/or pressure adjusted by a second amount) may be introduced into the in-mold tuning chamber 234. It will be appreciated that the temperature adjustment mechanism coupled to the runner 220 may be used to adjust the temperature of the polymeric material. Moreover, the polymeric material tuning assembly 246 may be adjusted while the polymeric material flows into the in-mold tuning chamber 234 during the first and second stages to achieve the different levels of polymer tuning. In this way, layers of polymeric material with different degrees of tuning may be formed in the in-mold tuning chamber 234. It will be appreciated that in such an example, the polymeric material flowed into the tuning chamber at the different stages may be delivered from different upstream devices, in some instances. However, in other instances, the polymeric material delivered to the in-mold tuning chamber 234 may be provided by a single upstream device, such as device 102.

In a second example, during a first stage, a first polymeric material may be introduced into the in-mold tuning chamber 234 and during a second stage, a second polymeric material may be introduced into the in-mold tuning chamber. In such an example, the first polymeric material may be different from the second polymeric material. For instance, the first polymeric may have a different polymer, filler, and/or blowing agent than the second polymeric material. In one use-case example, the first polymeric material may be EVA while the second polymeric material may be TPU. However, numerous suitable combinations of polymeric materials have been envisioned. In this way, different types of polymeric materials may be layered in the in-mold tuning chamber to achieve more granular tuning of the molded article's properties.

In a third example, during a first stage, a first polymeric material having a first tuning scheme may be delivered to the in-mold tuning chamber 234 during a first stage. Continuing with the third example, during a second stage, a second polymeric material having a second tuning scheme may be introduced into the in-mold tuning chamber 234. In such an example, the first polymeric material may be different from the second polymeric material. In this way, different polymeric materials with different degrees of tuning may be formed in layers in the in-mold tuning chamber.

In any of the aforementioned examples where different layers of polymeric material having different tuning and/or material compositions are released into the mold cavity 244, layers of polymeric material exhibiting different characteristics may be achieved. For instance, a first layer (e.g., a lower layer) of polymeric material in the mold may have a greater density than a second layer (e.g., upper layer). In such an example, the first layer of polymeric material in the mold may experience less foaming than the second layer. Additionally in some cases, one of the layers may experience substantially no foaming while the other layer may be foamed. In yet another example, the first layer of polymeric material in the mold may be at a higher temperature than the second layer which may affect the melt strength of the polymeric material in the layers. Thus, the first layer of polymeric material in the mold may have a greater melt strength than the second layer or vice versa.

FIG. 4 shows another stage in the molding process in the molding system 100 after the polymeric material has been released into the mold cavity 244 and the in-mold tuning chamber 234 is removed from the mold cavity and placed in a withdrawn position. In this way, the molten polymeric material can be rapidly released into the mold and nucleation in the polymeric material can unfold as designed without any unanticipated changes in the polymeric material. Consequently, the molded article's physical and mechanical properties are precisely controlled. Again, the gate valve 232 may be closed while the in-mold tuning chamber is removed from the mold.

Specifically, the computing device 124, in FIG. 1, may send control signals to the chamber retraction device 268 and specifically the actuator 272 to retract the rods 270 and move the chamber housing 236 out of the mold cavity 244 of the mold 245, to a position external to cavity as well as break a seal between the mold cavity 244 and the in-mold tuning chamber 234. Thus, the chamber housing 236 may be moved through an opening in the mold housing 279 during removal of the tuning chamber from the mold cavity.

FIG. 4 also shows the sealing mechanism 274 sealing the section 400 of the mold housing 279 when the in-mold tuning chamber 234 is retracted. In this way, the likelihood of polymeric material escaping from the mold is reduced.

Figure 5:
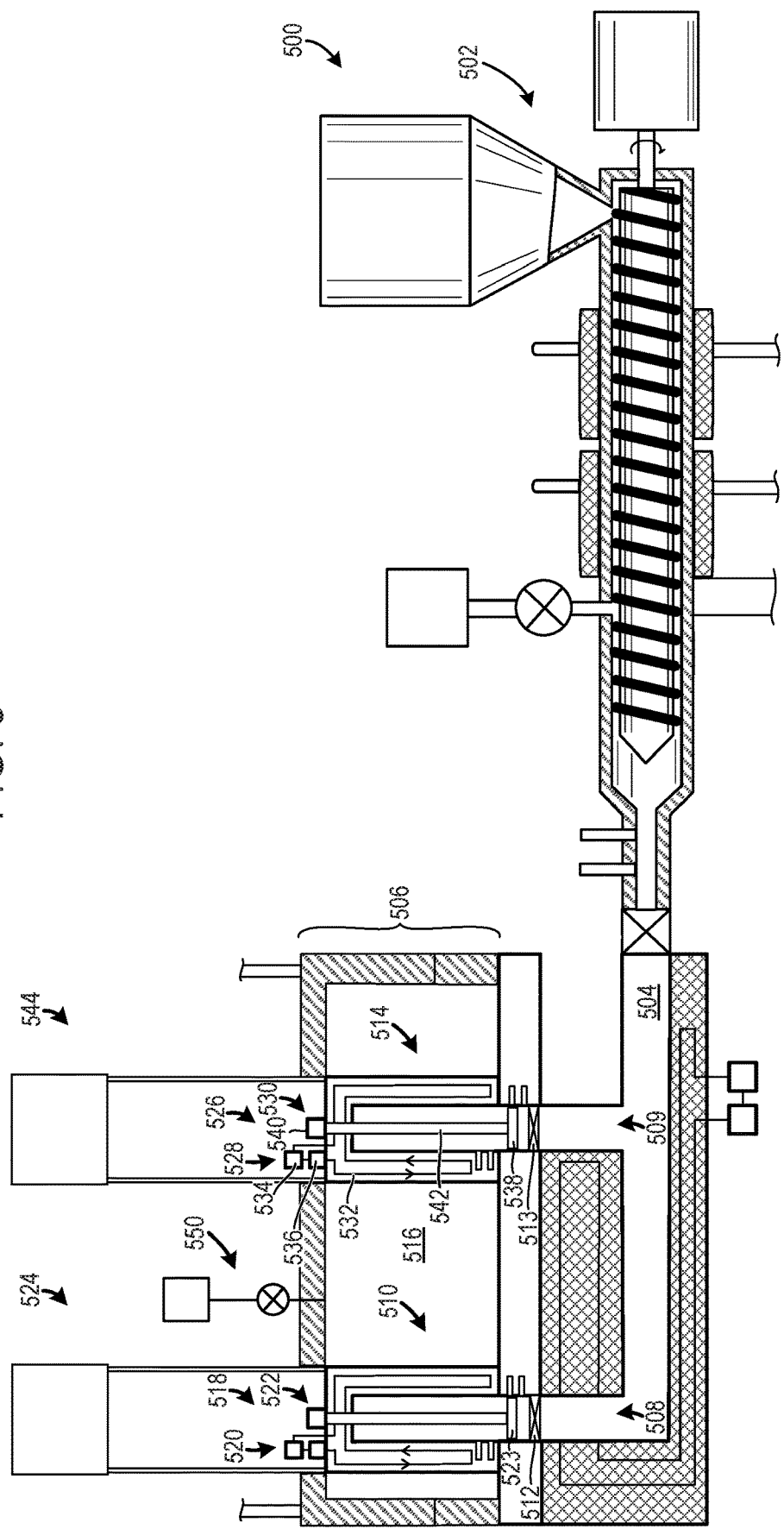
FIG. 5 shows another example of a molding system.

FIG. 5 shows another example of a molding system 500. The molding system 500, shown in FIG. 5, includes components, devices, parts, assemblies, etc., that may have similar functions, characteristics, profiles, etc., to the molding system 100, shown in FIGS. 1-4. For example, the molding system 500 includes a device 502 (e.g., injection device, extrusion device, etc.), runner 504, a mold 506, etc., similar to the components shown in the molding system 100 illustrated FIGS. 1-4. Redundant part descriptions are therefore omitted. Furthermore, it will be appreciated that the system components shown in FIG. 5 may be commanded, controlled, etc., via a computing device such as the computing device 124, shown in FIG. 1. As such, a computing device may send and receive signals from various components in the molding system 500, shown in FIG. 5, to carry out the molding methods, processes, control schemes, etc., described herein.

The molding system 500 includes the runner 504. In the example shown in FIG. 5, the runner 504 includes a first branch 508 providing molten polymeric material to a first in-mold tuning chamber 510 and a second branch 509 providing molten polymeric material to a second in-mold tuning chamber 514. A gate valve 512 may be included in the first branch 508, similar to the gate valve 232, shown in FIGS. 2-4. However, in other examples the gate valve 512 may be omitted from the system. Additionally, a gate valve 513 may be included in the second branch 509. The gate valves are designed to adjust the amount of molten polymeric material flowing through the branches of the runner 504.

The molding system 500 in FIG. 5 includes the first in-mold tuning chamber 510 as well as the second in-mold tuning chamber 514. As illustrated, both the in-mold tuning chambers are in a filling position where they are sealed from the remainder of a mold cavity 516.

A first polymeric material tuning assembly 518 including a temperature adjustment mechanism 520 and a pressure adjustment mechanism 522 with a piston 523 is shown coupled to the first in-mold tuning chamber 510. A first chamber retraction device 524 is also shown in FIG. 5. As mentioned above, the first in-mold tuning chamber 510, the first polymeric material tuning assembly 518, and/or the first chamber retraction device 524 may have similar features to the in-mold tuning chamber 234, the polymeric material tuning assembly 246, and the chamber retraction device 268, shown in FIGS. 2-4.

A second polymeric material tuning assembly 526 is also shown coupled to the second in-mold tuning chamber 514. The second polymeric material tuning assembly 526 includes a temperature adjustment mechanism 528 and a pressure adjustment mechanism 530. The temperature adjustment mechanism 528 may include a fluid loop 532, pump 534, and heat exchanger 536. The pump 534 may drive fluid flow through the fluid loop and the heat exchanger may remove or add heat to the fluid flowing through the loop. Additionally or alternatively, electric heating/cooling devices, included in the temperature adjustment mechanism, may be used to heat and/or cool the second in-mold tuning chamber 514.

The pressure adjustment mechanism 530 includes a piston 538 coupled to a piston actuator 540 via a stem 542. Again, the piston 538 may move in opposing directions to vary the pressure applied to the molten polymeric material in the second in-mold tuning chamber 514.

A second chamber retraction device 544 is shown coupled to the second in-mold tuning chamber 514. The second chamber retraction device 544 acts move the second in-mold tuning chamber 514 into and out of the mold cavity 516, similar to the first chamber retraction device 524. Thus, the second chamber retraction device may include rods, an actuator, etc., similar to the other retraction devices described herein. However, it will be appreciated that the size and other features of the retraction devices may vary based on the size and/or profile of the corresponding tuning chamber, the location of the tuning chamber, etc. Thus, the second chamber retraction device may be configured to seal, unseal, and/or remove the second in-mold tuning chamber 514 from the mold cavity 516.

The temperature and pressure adjustments in the first in-mold tuning chamber 510 and the second in-mold tuning chamber 514 may be carried out independently, in one example. As such, in one use case example, the temperature and/or pressure in the first in-mold tuning chamber 510 may be increased while the temperature and/or pressure in the second in-mold tuning chamber 514 may be decreased or vice versa. In another use case example, the temperature and/or pressure in the first in-mold tuning chamber 510 may be increased or decreased in tandem with an increase in the temperature and/or pressure in the second in-mold tuning chamber 514. In this way, the characteristics of targeted sections of the molded article may be selected to achieve desired physical and mechanical properties.

In the illustrated example, the first in-mold tuning chamber 510 and the second in-mold tuning chamber 514 may have similar internal volumes. However, in other examples, the first in-mold tuning chamber 510 and the second in-mold tuning chamber 514 may have different internal volumes. The internal volumes may be selected based on a desired amount of molten polymeric material slated to be released from each chamber during a molding cycle to achieve design objectives of the molded article. For instance, the first in-mold tuning chamber may have a greater internal volume than the second in-mold tuning chamber or vice versa.

In another example, the first temperature adjustment mechanism 520 and the second temperature adjustment mechanism 528 may utilize a common pump and heat exchanger. As such, fluid loops in both the first and second temperature adjustment mechanism may be in fluidic communication. In this way, the heating/cooling systems may share common components, thereby increasing the system's efficiency and reducing the system's profile.

In yet another example, the first in-mold tuning chamber 510 may receive a molten polymeric material from a second device (e.g., injection device) distinct from the device 502 (e.g., injection device). The second device may, for example, generate a molten SPS with a different polymeric material, filler, blowing agent (e.g., SCF), etc., than the first device. In this way, the molded article may have sections with different types of material. Consequently, the article may have greater material variance, allowing materials in targeted sections to be selected based on specific end-use goals. In one use case, for example, it may be desirable to have a portion of a sole of a shoe with greater flexibility while having another section of the sole with greater impact resistance. As such, the polymeric material injected near the front of the sole may be selected and/or tuned to exhibit increased flexibility while the polymeric material in the rear of the sole may be selected and/or tuned to exhibit greater impact resistance. In this way, a greater amount of granularity of the polymer tuning may be realized during the molding process. However, it will be appreciated that numerous variations in the material properties and distribution of the polymeric material in the molded article are possible with the molding system described herein.

In other examples, the orientations of the in-mold tuning chambers may not be equivalent. For instance, in the example illustrated in FIG. 5, the central axis of the pistons 538 and 523 in the first in-mold tuning chamber 510 and the second in-mold tuning chamber 514 are parallel to one another. However, in other examples, the axes of the chambers may not be parallel and the in-mold tuning chambers 510 and 514 may be removed from different directions, sides of the mold, etc. Consequently, the molten polymeric material may be introduced into targeted regions of the mold from both chambers to achieve desired polymeric material distribution in the mold. Further, in one example, the first in-mold tuning chamber 510 and the second in-mold tuning chamber 514 may be transitioned from the filling position to a withdrawn position at selected times. Specifically, in one example, the time when the first in-mold tuning chamber is released from the filling positioned may be different from the time when the second in-mold tuning chamber is released from its filling position. For instance, the tuned molten polymeric material in the first in-mold tuning chamber may be released prior to the release of the tuned molten polymeric material from the second in-mold tuning chamber to allow the polymeric material in the first chamber to expand into a desired location in the mold without interference from the polymeric material released from the second tuning chamber. However, in other examples, the polymeric material in each of the first and second in-mold tuning chamber may be released at concurrent or overlapping times.

Additionally, in some examples, each of the first and/or second in-mold tuning chambers, 510 and 514 respectively, may be filled with layers of polymeric material(s). Each of the layers of polymeric material(s) may have a different polymer, filler, and/or blowing agent, in one example. Additionally or alternatively, the layers of polymeric material(s) in the first and/or second in-mold tuning chambers may be tuned by different amounts. For instance, a first layer of polymeric material may have a greater temperature than a second layer of polymeric material in either the first or second in-mold tuning chambers.

Moreover, in some examples, the polymeric material in the layers and/or in the different tuning chamber may achieve different degrees of foaming when released into the mold. For instance, the polymeric material in the first in-mold tuning chamber 510 may not be foamed and the polymeric material in the second in-mold tuning chamber 514 may be foamed by a desired amount when released into the mold. Further, a layer of polymeric material in the first and/or second in-mold tuning chamber may achieve a greater degree of foaming than a layer of polymeric material in the first and/or second in-mold tuning chamber. In this way, there may be a variance in polymer foaming in different layers in one or both of the tuning chambers and/or a variance in foaming in between the separate tuning chambers when the tuning chamber are unsealed. Consequently, the molded article's material properties can be tuned with even greater precision.

It will also be appreciated that the molding system 500 may include a mold actuation device for opening and closing the mold similar to the mold actuation device 280, shown in FIG. 2. Additionally, the molding system 500 may also include a GCP assembly 550, similar to the GCP assembly 286 shown in FIG. 2.

Figure 6:
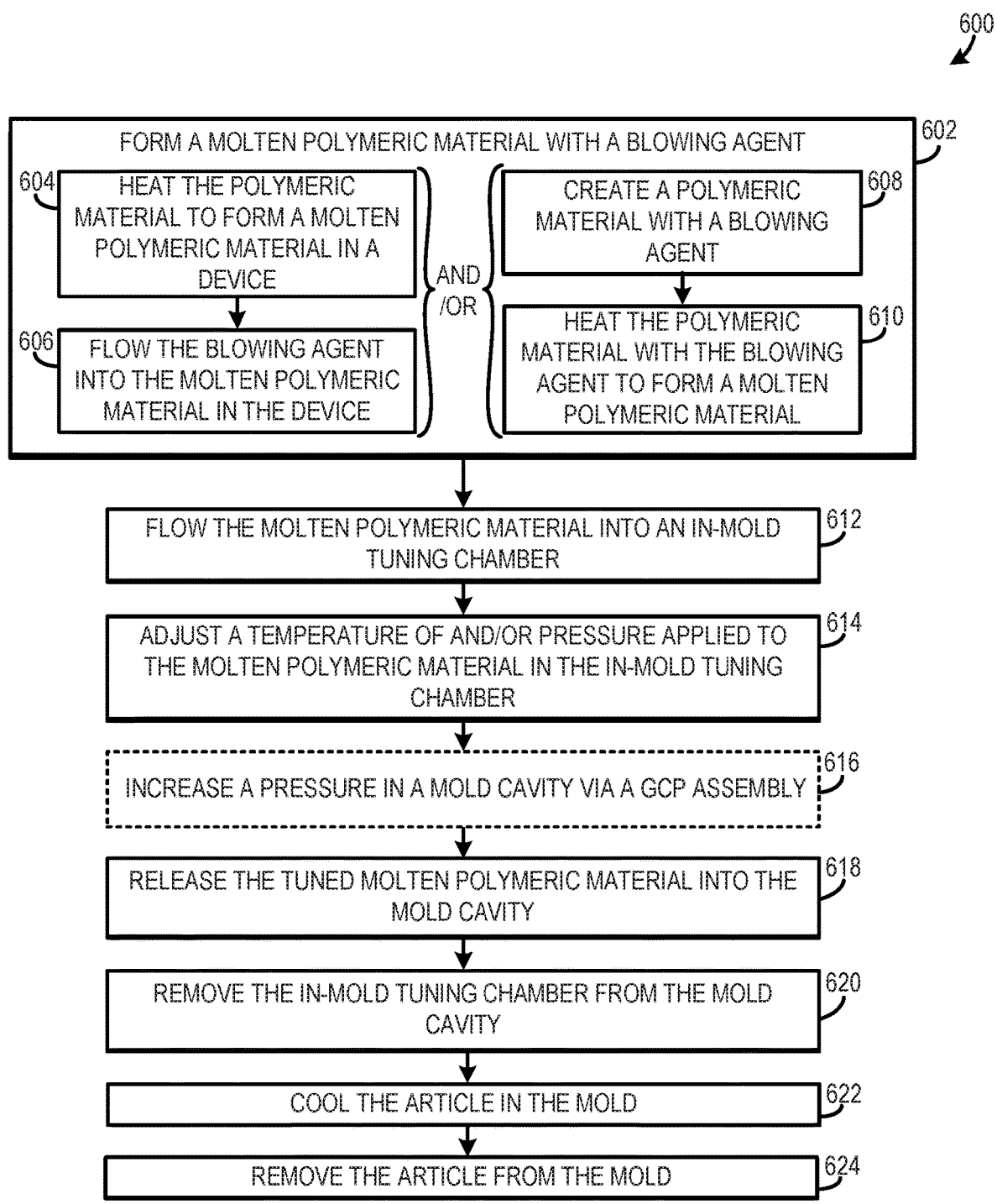
FIG. 6 shows a method for operating a molding system.

FIG. 6 shows method 600 for operation of a molding system. Method 600 as well as the other methods described herein may be implemented by the molding systems, components, devices, etc., described herein with regard to FIGS. 1-5. However, in other examples, the methods may be implemented by other suitable molding systems, components, devices, etc.

At 602, the method includes forming a molten polymeric material with a blowing agent. However, in other examples, a molten polymeric material may be formed without a blowing agent. Forming the molten polymeric material with the blowing agent may include steps 604-606 and/or steps 608-610. At 604, the method includes forming a molten polymeric material in a device (e.g., injection device or extrusion device). For instance, heaters coupled to the device may be activated to heat polymeric material in a barrel of the device to form a molten polymeric material.

At 606, the method includes flowing a blowing agent via a blowing agent delivery assembly into the molten polymeric material as it travels through the device to form a molten SPS. Therefore, the molten SPS may include the molten polymeric material having the blowing agent dissolved therein. In one example, the blowing agent may be a physical blowing agent such as carbon dioxide and/or nitrogen that may be in a supercritical state, for instance. However, in other examples, the blowing agent may be a chemical blowing agent. Further, in other examples, the blowing agent may not be flowed into the device and therefore the device may include the molten polymeric material without a blowing agent dissolved therein. In yet another example, the blowing agent may be dissolved in the molten polymeric material upstream of the device.

On the other hand, at 608, the method includes creating a polymeric material with a blowing agent upstream of the device. For instance, the polymeric material may be manufactured with a blowing agent or a blowing agent may be introduced into a polymeric material in a reservoir or in a component upstream of a reservoir. Next at 610, the method includes heating the polymeric material with the blowing agent to form a molten polymeric material in the device. In this way, the blowing agent may be introduced into the polymeric material upstream of the device and then the polymeric material and the blowing agent may be heated to form a molten polymeric material with a blowing agent.

At 612, the method includes flowing the molten polymeric material into an in-mold tuning chamber from a runner. In one example, a piston in the in-mold tuning chamber may be retracted to facilitate molten polymeric material flow into the in-mold tuning chamber. Additionally, in one example, a gate valve may be opened or held open and a screw may be advanced in the barrel of the device to allow molten polymeric material to flow into the in-mold tuning chamber. Additionally or alternatively, a barrel valve may be opened to allow molten polymeric material to flow from the device to the in-mold tuning chamber. As previously discussed, the polymeric material may be flowed into the tuning chambers sequentially to form layers, in some instances.

Next, at 614, the method includes adjusting a temperature of and/or a pressure applied to the molten polymeric material in the in-mold tuning chamber through operation of a polymeric material tuning assembly coupled to the in-mold tuning chamber to generate a tuned molten polymeric material. The temperature and/or pressure adjustments of the molten polymeric material may be chosen to alter the molded article's physical and mechanical properties. For instance, step 614 may additionally or alternatively include adjusting a melt strength of a molten polymeric material (e.g., molten SPS) in the in-mold tuning chamber. In one example, the melt strength of the molten polymeric material may be increased to improve the quality of the molded article. Melt strength may be defined as the resistance of the molten polymeric material to stretching. Therefore, in one example, melt strength may be a measure of shear viscosity, elongational viscosity, and/or modulus. In one specific example, an adjustment in melt strength is said to occur when one or more of the shear viscosity, elongational viscosity, and/or modulus of the molten polymeric material changes by a threshold amount (e.g., 0.5%, 1.0%, 1.5%, etc.).

At 616, the method may include increasing a pressure in the mold cavity via a GCP assembly. However, in other examples, GCP may not be used in the molding process and step 616 may therefore be omitted. It will also be appreciated that GCP may be released during and/or after the tuned polymeric material is introduced into the mold. The rate of release of the GCP may be based on system conditions such as the temperature of the polymeric material, the pressure applied to the polymeric material in the in-mold tuning chamber, polymer composition, etc.

At 618, the method includes releasing the tuned molten polymeric material into the mold cavity. Releasing the tuned molten polymeric material into the mold enables an article to be formed in the mold. In one example, the chamber retraction device may be actuated to move the in-mold tuning chamber away from an interior wall of the mold cavity to break a seal between the in-mold tuning chamber and an interior wall of the mold cavity, thereby releasing the polymeric material into the mold cavity. Consequently, the tuned polymeric material may be rapidly released into the mold cavity, enabling foaming in the polymeric material to unfold as intended.

At 620, the method includes removing the in-mold tuning chamber from the mold cavity. The chamber retraction device may be used to remove the in-mold tuning chamber. For instance, the chamber retraction device may move the chamber housing outside of the mold cavity. Additionally, the mold cavity may be sealed via a sealing mechanism subsequent to removal of the in-mold tuning chamber from the mold cavity. In this way, the area where the tuning chamber is removed from the mold can be sealed to reduce the likelihood of (e.g., prevent) polymeric material escaping from the mold. Next, at 622, the method includes cooling the article in the mold and at 624, the method includes removing the article from the mold. In some examples, the article may cooled by a predetermined amount (e.g., 5° C., 10° C., 20° C., etc.) and then released from the mold only after the desired amount of cooling has been achieved. Furthermore, the amount of cooling may be expressed as a percentage of a peak polymer temperature, a percentage of ambient temperature, etc., in some examples. For instance, the article may be released from the mold when it has achieved a temperature drop of 10%, 20%, 30%, etc., from the peak polymeric material temperature.

Method 600 enables a temperature and/or pressure adjusted molten polymeric material to be released directly into a mold cavity to reduce the likelihood of, and in some cases avoid, unwanted material property changes in the molten polymeric material prior to introduction of the molten polymeric material into the mold. For instance, unwanted nucleation may be avoided when the molten polymeric material is precisely temperature and pressure controlled and then directly released into the mold cavity from the tuning chamber nested in the mold.

Figure 7:
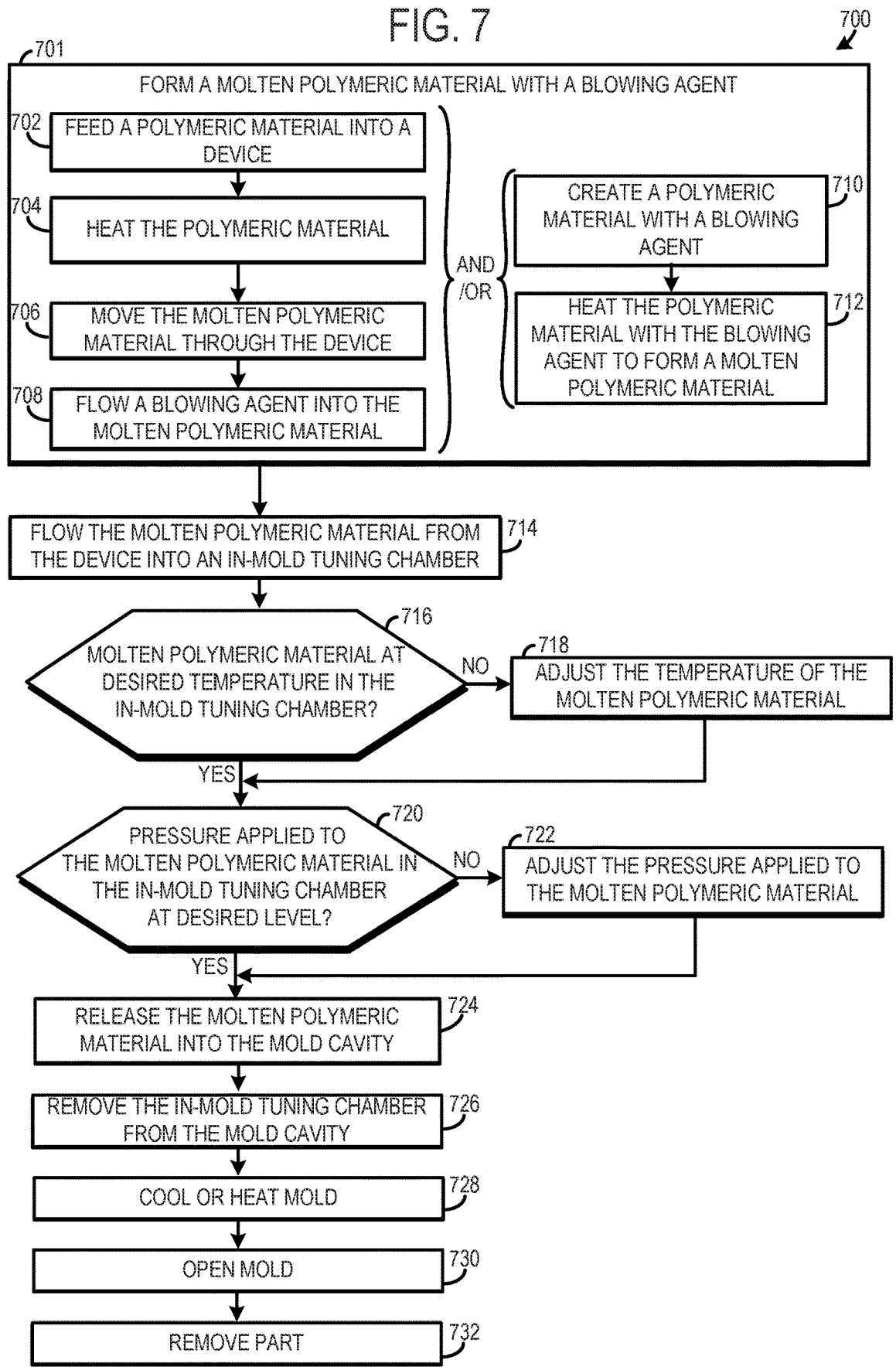
FIG. 7 shows a detailed method for operating a molding system.

FIG. 7 shows a more detailed method 700 for operation of a molding system. At 701, the method includes forming a molten polymeric material with a blowing agent. Forming a molten polymeric material with a blowing agent may include steps 702-708 and/or steps 710-712.

At 702, the method includes feeding a polymeric material into a device (e.g., injection device or extrusion device). For instance, pellets, chips, etc., may be fed from a reservoir into a barrel of the device.

Next at 704, the method includes heating the polymeric material in the device to form the molten polymeric material. In one example, step 704 may also include shearing the polymeric material via a screw included in the device. The polymeric material heating may be carried out by activating heating devices coupled to the barrel. At 706, the method includes moving the molten polymeric material through the device. For instance, the screw enclosed in the barrel may be rotated and/or moved forward to progress the molten polymeric material through the barrel.

Next at 708, the method includes flowing the blowing agent into the molten polymeric material as it travels through the device. Therefore, it will be appreciated that a molten SPS may be formed in the barrel. In such an example, the blowing agent may be a physical blowing agent which may in some cases be an SCF such as supercritical nitrogen and/or carbon dioxide. However, other suitable blowing agents have been contemplated. Moreover, in other examples, the barrel may include only the molten polymeric material.

On the other hand, at 710, the method includes creating a polymeric material with a blowing agent and at 712 the method includes heating the polymeric material with the blowing agent to form a molten polymeric material. The polymeric material may be created with the blowing agent during manufacturing of the blowing agent or in a component upstream of the device such as the reservoir. For instance, a blowing agent delivery assembly may be coupled to the reservoir and provide polymeric material thereto.

At 714, the method includes flowing the molten polymeric material from the device into the in-mold tuning chamber. Said molten polymeric material flow may be carried out by opening a barrel valve in the device, opening a gate valve in the runner, and/or retracting a piston into the in-mold tuning chamber. Specifically, in one example, the piston may be in an extended position where the piston is positioned in the runner and the piston may be retracted into a position within the chamber to regulate molten polymeric material flow therein.

At 716, the method includes determining if the molten polymeric material is at a desired temperature or within a desired temperature range in the in-mold tuning chamber. The temperature determination may involve a comparison of temperature and/or pressure signals from sensors in the system against predetermined temperature set-points and/or ranges. For instance, a temperature sensor coupled to the in-mold tuning chamber may indicate that the molten polymeric material temperature is below a desired range. As such, it may be ascertained that the molten polymeric material is not at a desired temperature. However, numerous schemes may be utilized to determine if the molten polymeric material is at a desired temperature or within a desired temperature range.

If the molten polymeric material in the in-mold tuning chamber is not at the desired temperature or within the desired temperature range (NO at 716) the method proceeds to 718 where the method includes adjusting the temperature of the molten polymeric material in the in-mold tuning chamber. The temperature of the molten polymeric material may be adjusted through operation of a temperature adjustment mechanism in the polymeric material tuning assembly. For instance, coolant circulation in a coolant circuit may be increased to decrease a temperature of the molten polymeric material and/or heaters coupled to the in-mold tuning chamber may be activated to increase polymeric material temperature. Specifically, in one example, the temperature of the molten polymeric material may be adjusted to decrease losses in the system and/or to enable the molten polymeric material to achieve desired properties, as previously discussed.

On the other hand, if the molten polymeric material is at the desired temperature or within the desired temperature range (YES at 716) the method proceeds to 720. At 720, the method includes determining if the pressure applied to the molten polymeric material in the in-mold tuning chamber is at a desired level or within an acceptable range. The pressure determination may take place via the comparison of pressure and/or temperature signals from sensors in the system against predetermined pressure set-points and/or ranges. For instance, a pressure sensor coupled to the in-mold tuning chamber may indicate that the pressure applied to the molten polymeric material is below a desired range, set-point, etc. As such, it may be ascertained that the pressure applied to the molten polymeric material is not at a desired level. However, numerous schemes for determining if the pressure applied to the molten polymeric material is at a desired level have been contemplated.

If the pressure applied to the molten polymeric material is not at the desired level or within the desired range (NO at 720) the method moves to 722 where the method includes adjusting a pressure applied to the molten polymeric material in the in-mold tuning chamber. Adjusting the pressure applied to the molten polymeric material may include adjusting the position of the piston in the in-mold tuning chamber. Thus, the piston may be moved in a first direction to increase the pressure applied to the molten polymeric material and moved in a second direction opposing the first to decrease the pressure applied to the molten polymeric material.

On the other hand, if the pressure applied to the molten polymeric material is at the desired level or within a desired range (YES at 720) the method advances to 724 where the method includes releasing the molten polymeric material into the mold cavity from the in-mold tuning chamber. As such, a temperature and/or pressure adjusted molten polymeric material may be flowed into the mold cavity. Releasing the molten polymeric material into the mold cavity may include actuating the chamber retraction device to break the seal between the in-mold tuning chamber housing and an interior wall of the mold cavity.

At 726, the method includes removing the in-mold tuning chamber from the mold cavity. Such removal may take place via actuation of the chamber retraction device to retract the in-mold tuning chamber into a region exterior to the mold cavity.

At 728, the method may include cooling or heating the mold, releasing of the counter pressure in the mold, and at 730, the method includes opening the mold. Opening the mold may include actuating a clamping device coupled to a first section of the mold to release the first section from a second section. However, a variety of suitable techniques for opening the mold have been contemplated. At 732, the method includes removing the article from the mold. Again, the article may be removed from the mold when it has achieved a desired amount of cooling.

Method 700 enables precise adjustment in the temperature of and/or pressure applied to the molten polymeric material directly before and/or while it is released into the mold, allowing for the fine-tuning of various properties of the polymeric material such as bubble size, bubble distribution, skin thickness, etc. Consequently, the molding process may be accurately controlled to mold articles with targeted characteristics.

Figure 8:
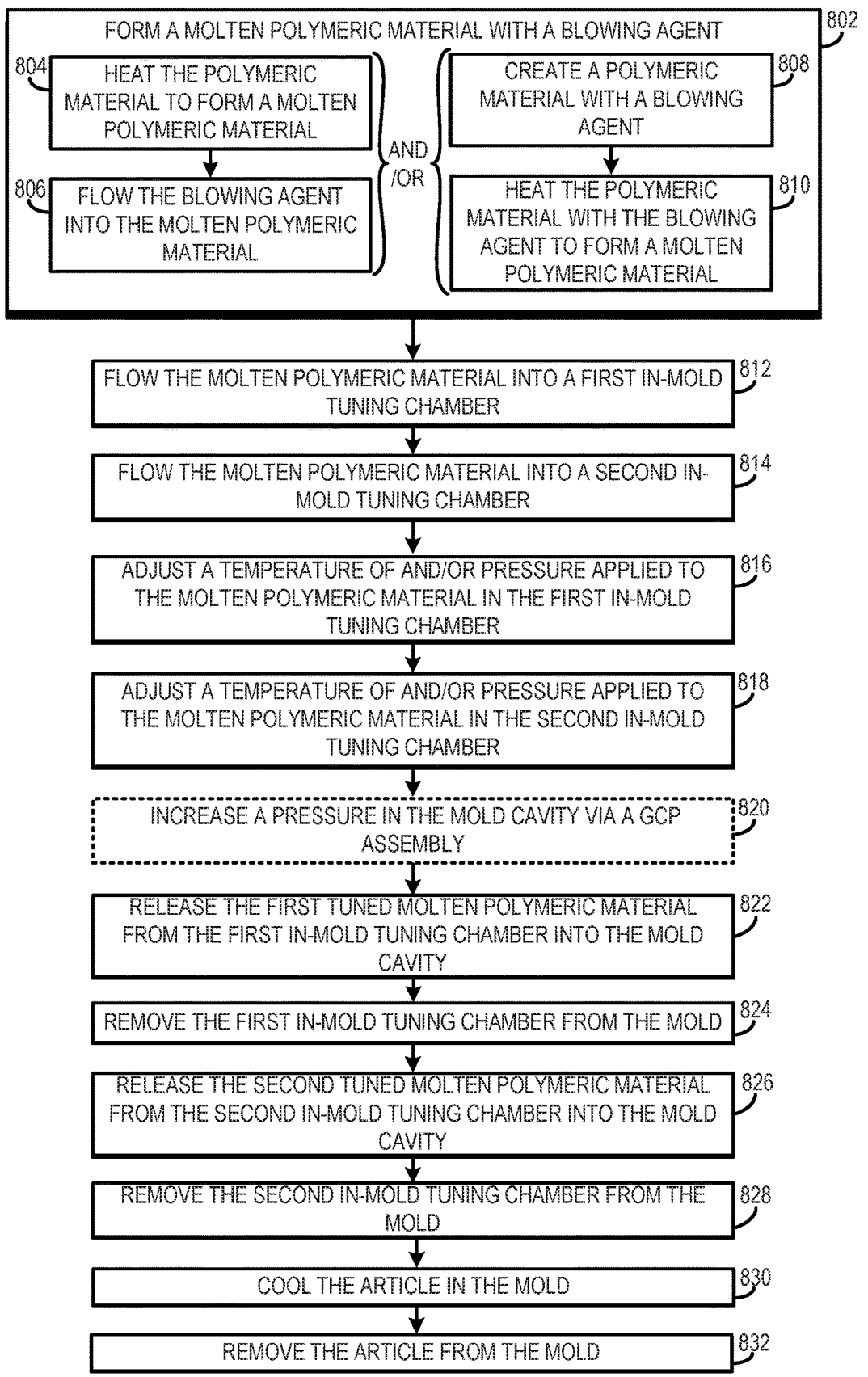
FIG. 8 shows another method for operating a molding system including two in-mold tuning chamber.

FIG. 8 shows a method 800 for operation of a molding system. Specifically, the method 800 may be carried out via a molding system with two in-mold tuning chambers such as the molding system, shown in FIG. 5. However, it will be appreciated that other suitable molding systems may be used to carry out method 800, in other examples.

At 802 the method includes forming a molten polymeric material with a blowing agent. However, in other examples, a molten polymeric material may be formed without a blowing agent. Forming the molten polymeric material with the blowing agent may include steps 804-806 and/or steps 808-810. At 804, the method includes heating polymeric material in a device (e.g., injection device or extrusion device) to form the molten polymeric material. For instance, heaters coupled to the device may be activated to heat polymeric material in a barrel of the device to form a molten polymeric material.

At 806, the method includes flowing the blowing agent via a blowing agent delivery assembly into the molten polymeric material as it travels through the device to form a molten polymeric material. Therefore, in one example, a molten SPS may be formed in the device that includes the molten polymeric material having the blowing agent dissolved therein. In one example, the blowing agent may be a physical blowing agent such as carbon dioxide and/or nitrogen that may be in a supercritical state, for instance. However, in other examples, the blowing agent may be a chemical blowing agent. Further, in other examples, the blowing agent may not be flowed into the device and therefore the device may include the molten polymeric material without a blowing agent dissolved therein. In yet another example, the blowing agent may be dissolved in the molten polymeric material upstream of the device.

On the other hand, at 808, the method includes creating the polymeric material with the blowing agent upstream of the device. For instance, the polymeric material may be manufactured with a blowing agent or a blowing agent may be introduced into the polymeric material in a reservoir or in a component upstream of a reservoir. Next at 810, the method includes heating the polymeric material with the blowing agent to form the molten polymeric material in the device. In this way, the blowing agent may be introduced into the polymeric material upstream of the device and then the polymeric material and the blowing agent may be heated to form a molten polymeric material with the blowing agent.

Next, at 812, the method includes flowing the molten polymeric material into a first in-mold tuning chamber from the device and at 814, the method correspondingly includes flowing the molten polymeric material into a second in-mold tuning chamber from the device. In particular, the molten polymeric material may be flowed from the device, to a runner, and then to the first and second in-mold tuning chambers from branches of the runner. However, in other examples, separate devices (e.g., injection devices) may provide different types of polymeric materials to the first and second in-mold tuning chambers. As previously discussed, the polymeric material(s) may be flowed into one or both of the tuning chambers sequentially to form different layers, in some instances.

At 816, the method includes adjusting a temperature of and/or a pressure applied to the molten polymeric material in the first in-mold tuning chamber to generate a first tuned molten polymeric material and at 818 the method includes adjusting a temperature of and/or a pressure applied to the molten polymeric material in the second in-mold tuning chamber to generate a second tuned molten polymeric material. In one example, the level of temperature and/or pressure adjustment in the first in-mold tuning chamber may be different from a level of temperature and/or pressure adjustment in the second in-mold tuning chamber. In this way, the molten polymeric material in the first and second in-mold tuning chambers may independently controlled. For instance, the molten polymeric material in the first and second in-mold tuning chambers may be separately temperature and/or pressure adjusted to achieve varying density gradients in the molded article. Consequently, molded articles with variable properties may be achieved, if desired. For instance, it may be desirable to provide a denser foam in a heel section of sole of an article of footwear while providing a less dense foam in other sections of the sole. In another use case scenario, a section, portion, etc., of a molded article may be designed with improved insulating capabilities and another section, portion, etc., of the molded article may be designed with improved compliance. The use case scenarios are provided as examples to aid in the understanding of potential applications the molding method and that numerous use case scenarios have been contemplated. Moreover, in other examples, the pressure and/or temperature adjustments in the first and second in-mold tuning chambers may be carried out using similar set-points.

At 820, the method includes increasing a pressure in the mold cavity via a GCP assembly. For instance, a valve in the GCP assembly may be opened to introduce a high pressure gas into the mold cavity. In this way, the release of the tuned molten polymeric material into the mold may be carried out with yet another layer of control, enabling additional tuning of polymeric material properties.

At 822, the method includes releasing the first tuned molten polymeric material from the first in-mold tuning chamber into the mold cavity. For instance, the chamber retraction device coupled to the first in-mold tuning chamber may be actuated to break a seal between the first in-mold tuning chamber and a wall of the mold cavity to quickly release the first tuned molten polymeric material into the remainder of the mold.

At 824, the method includes removing the first in-mold tuning chamber from the mold. The chamber retraction device may be actuated to move the first in-mold tuning chamber to a position external to the mold cavity.

At 826, the method includes releasing the second tuned molten polymeric material from the second in-mold tuning chamber into the mold cavity and at 828 the method includes removing the second in-mold tuning chamber from the mold. Again, a chamber retraction device may be actuated to both release the second tuned molten polymeric material into the mold and to remove the second in-mold tuning chamber from the mold cavity. It will be appreciated that steps 824 and 828 may be implemented at overlapping periods, in one example, or may be implemented at successive times, in other examples. Conversely, steps 822 and 826 may be implemented at overlapping periods, in one example, or may be implemented at successive times, in other examples. Moreover, it will be appreciated that after both the in-mold tuning chambers release the polymeric material into the mold cavity, an article may be formed in the mold.

Next, at 830, the method includes cooling the article in the mold and at 832, the method includes removing the article from the mold. Again, the article may be removed from the mold when it has achieved a desired amount of cooling.

Method 800 enables multiple in-mold tuning chambers to release molten polymeric material into the mold cavity to allow material properties in regions of the article to be separately adjusted, if desired. In this way, the regions of the article may have a variance in physical and mechanical properties. As such, a more granular level of mold tuning may be achieved to mold articles with desired characteristics. For instance, an article may be molded with one section, layer, etc., having greater abrasion resistance and another section, layer, etc., having greater compliance. In another example, sections of the article may have varying densities caused by different degrees of foaming in the polymeric material. Thus, the article may have varying density gradients that may allow the article to have a desired weight distribution, flexion characteristics, etc.

Figure 9:
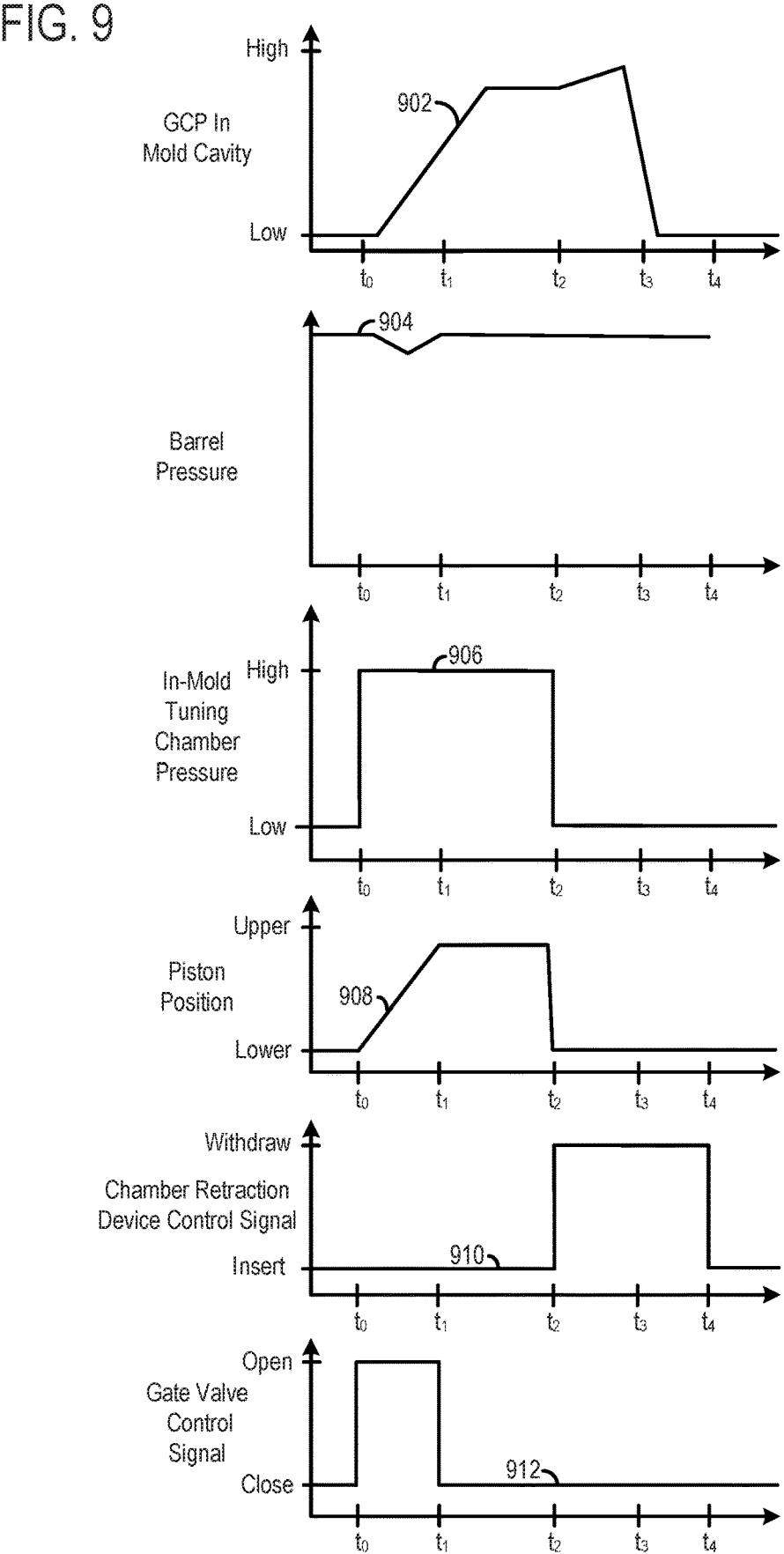
FIG. 9 shows graphs depicting pressure curves, piston position, and control signals during a molding process.

Now turning to FIG. 9, depicting pressure graphs, a piston position graph, and control signal graphs during a molding process. The molding process may be carried out by the molding systems described above with regard to FIGS. 1-5 or may be implemented by other suitable molding systems. The example of FIG. 9 is drawn substantially to scale, even though each and every point is not labeled with numerical values. As such, relative differences in timings can be estimated by the drawing dimensions. However, other relative timings may be used, if desired. Furthermore, in each of the graphs time is represented on the abscissa. Additionally, the graphical control strategy of FIG. 9 is illustrated as a use case example and that numerous molding system control strategies have been contemplated.

Specifically, curve 902 illustrates a GCP plot, curve 904 illustrates a barrel pressure plot, and curve 906 indicates an in-mold tuning chamber pressure.

A piston position plot of the piston in the pressure adjustment mechanism is indicated at 908. The upper value on the ordinate may indicate a piston position where the volume of the in-mold tuning chamber is at or near its largest volume and the lower value on the ordinate may indicate a piston position where the volume of the in-mold tuning chamber is at or near its smallest volume.

A control signal that is sent to the chamber retraction device is indicated at 910. An insert and withdraw value are indicated on the ordinate. The insert value corresponds to a control signal commanding the in-mold tuning chamber to be placed in a filling position where the chamber is sealed with an outer wall of the mold cavity. On the other hand, the withdraw value corresponds to a control signal commanding the in-mold tuning chamber to be moved out of the mold cavity. Thus, the withdraw control signal may break the seal between the tuning chamber and the wall of the mold cavity.

A control signal that is sent to the gate valve in the runner is indicated at 912. An open and a close value are indicated on the ordinate. The open value corresponds to a valve control signal opening of the gate valve to allow molten polymeric material to flow from the runner to the in-mold tuning chamber. On the other hand, the close value corresponds to a gate valve control signal closing of the gate valve thereby inhibiting the flow of molten polymeric material from the runner to downstream components. Although, the graph 912 only shows an open signal and a close signal it will be appreciated that the gate valve may have a plurality of open positions that allow polymeric material flowrate adjustments.

At $t_0$, the in-mold tuning chamber is in a filling position in the mold cavity. Additionally, at $t_0$, the piston is moved away from a lower position toward the upper position and the gate valve is opened. In this way, the in-mold tuning chamber can be filled with a molten polymeric material (e.g., molten SPS). At $t_0$, the mold is pressurized via the GCP assembly. It will also be appreciated that the mold is closed or sustained in a closed position at $t_0$. Further, in one example, the barrel valve may be opened to flow molten polymeric material from the device into the runner and/or the screw may be advanced in the barrel of the device to assist in the flow of polymeric material into the in-mold tuning chamber. Additionally, the barrel pressure decreases and then subsequently increases between $t_0$ and $t_1$.

At $t_1$, the gate valve is closed. Additionally, at $t_1$, the piston may reach an upper position. However, it will be appreciated that the position of the piston may be chosen based on a desired amount of pressure tuning of the molten polymeric material enclosed in the tuning chamber. Thus, at $t_1$ filling of the in-mold tuning chamber ceases.

Next at $t_2$, the in-mold tuning chamber is commanded to be withdrawn from the mold cavity. As such, the seal between the in-mold tuning chamber and the interior wall of the mold cavity is broken. In this way, the molten polymeric material may be rapidly released into the mold cavity from the in-mold tuning chamber. As such, foaming may occur in the polymeric material while it enters the mold cavity. Additionally, at $t_2$, the GCP in the mold cavity is increased. In this way, the foaming of the polymeric material in the mold may be precisely controlled. However, in other examples, the GCP may be sustained at a desired level or released at $t_2$. Additionally, at $t_2$ the piston may be moved towards the lower position. However, in other examples, the piston may be moved toward the lower position at a different time.

Additionally, at $t_2$, the in-mold tuning chamber drops to a lower level. Although plot 906 shows the pressure in the in-chamber level off between $t_0$ and $t_2$, it will be appreciated that the pressure applied to the molten polymeric material in the in-mold tuning chamber may be tuned any time prior to $t_2$, based on operating conditions in the system. Such pressure tuning may be carried out via the pressure control mechanism in the polymeric material tuning assembly. For instance, the in-mold tuning chamber pressure may be increased to reduce the likelihood of unwanted nucleation in the molten polymeric material. However, in other examples, the tuning chamber pressure may be decreased. As such, the in-mold tuning chamber pressure may have a different profile than the illustrated profile. Moreover, it will be appreciated that temperature adjustment of the molten polymeric material may be carried out any time prior to $t_2$ to allow the molten polymeric material in the in-mold tuning chamber to be temperature tuned.

Additionally, at $t_2$ the screw may be retracted in the barrel to decrease the barrel pressure. However, in other examples, the screw may not be retracted and/or the barrel pressure may not drop.

Next at $t_3$, the GCP is released from the mold chamber. The GCP is released to enable the molten polymeric material to flow into the mold cavity from the in-mold tuning chamber at a desired rate and achieve a desired amount of foaming. Next at $t_4$, the in-mold tuning chamber may be placed in a filling position in anticipation of another molding cycle. Additionally, at $t_4$, the mold may be opened and the foamed article may be removed from the mold once the mold is opened.

It will be appreciated that the molding process may be repeated to generate a plurality of articles from the mold, if desired. In such an example, the time interval to mold one article is referred to as a cycle time. It will be appreciated that due to the temperature and pressure control of the molten polymeric material the cycle time may be reduced, if desired. For example, the molten polymeric material may be at a lower temperature when entering the mold when compared to previous molding techniques, thereby reducing cycle time. However, in other examples, the molten polymeric material may be at a higher temperature than previous molding processes.

The invention will further be described in the following paragraphs. In one aspect, a method for operation of a molding system is provided. The method includes flowing a first molten polymeric material from an upstream device into a first in-mold tuning chamber in a filling position where the first in-mold tuning chamber is positioned at least partially within a mold cavity, adjusting at least one of a temperature of and a pressure applied to the first molten polymeric material in the first in-mold tuning chamber to create a first tuned molten polymeric material, and releasing the first tuned molten polymeric material into the mold cavity from the first in-mold tuning chamber. In one example, the method may further include removing the first in-mold tuning chamber from the mold cavity. Further, in one example, the method may further include flowing a second molten polymeric material into a second in-mold tuning chamber in a filling position where the second in-mold tuning chamber is at least partially within the mold cavity, adjusting at least one of a temperature of and a pressure applied to the second molten polymeric material in the second in-mold tuning chamber to create a second tuned molten polymeric material, and releasing the second tuned molten polymeric material into the mold cavity from the second in-mold tuning chamber. Further in one example, the method may further include cooling the first tuned molten polymeric material in the mold cavity to form a molded article. Additionally, in one example, the method may further include removing the molded article from the mold cavity.

In another aspect, a molding system is provided that includes a first in-mold tuning chamber configured to adjust a temperature of and/or a pressure applied to a first molten polymeric material to generate a first tuned molten polymeric material and configured to be arranged in a filling position and a withdrawn position, where, in the filling position, the first in-mold tuning chamber is in fluidic communication with an upstream device and is at least partially positioned within a mold cavity, and where, in the withdrawn position, the first in-mold tuning chamber is positioned external to the mold cavity.

In another aspect, a method for operation of a molding system is provided. The method includes actively adjusting a melt strength of a molten polymeric material in an in-mold tuning chamber by applying a controlled pressure to the molten polymeric material and/or actively adjusting a temperature of the molten polymeric material to generate a tuned molten polymeric material, and releasing the tuned molten polymeric material into a mold cavity from the in-mold tuning chamber. In one example, the method may further include adjusting at least one of a pressure applied to and a temperature of a first molten polymeric material to generate the first tuned molten polymeric material in the first in-mold tuning chamber, and adjusting at least one of a pressure applied to and a temperature of a second molten polymeric material to generate the second tuned molten polymeric material in the second in-mold tuning chamber. The method may further include, in one example, cooling the tuned molten polymeric material in the mold cavity to form a molded article. The method may further include, in one example, removing the molded article from the mold cavity.

In another aspect, a method for operation of a molding system is provided. The method includes releasing a first tuned molten polymeric material into a mold cavity from a first in-mold tuning chamber at least partially positioned within the mold cavity, and releasing a second tuned molten polymeric material into the mold cavity from a second in-mold tuning chamber at least partially positioned within the mold cavity, where releasing the first and second tuned molten polymeric materials into the mold cavity creates an article within the mold cavity. The method may further include, adjusting at least one of a pressure applied to and a temperature of a first molten polymeric material to generate the first tuned molten polymeric material in the first in-mold tuning chamber, and adjusting at least one of a pressure applied to and a temperature of a second molten polymeric material to generate the second tuned molten polymeric material in the second in-mold tuning chamber. The method may also include, in one example, cooling the first tuned molten polymeric material in the mold cavity to form a molded article and removing the molded article from the mold cavity.

In any of the aspects or combinations of the aspects, releasing the first tuned molten polymeric material into the mold cavity may include actuating a chamber retraction device coupled to the first in-mold tuning chamber to break a seal between the first in-mold tuning chamber and an interior wall of the mold cavity.

In any of the aspects or combinations of the aspects, the step of adjusting at least one of the temperature of and the pressure applied to the first molten polymeric material may be implemented prior to releasing the first tuned molten polymeric material into the mold cavity.

In any of the aspects or combinations of the aspects, the first tuned molten polymeric material may be released from the first in-mold tuning chamber into the mold cavity at a different time than the release of the second tuned molten polymeric material from the second in-mold tuning chamber into the mold cavity.

In any of the aspects or combinations of the aspects, a volume of the first in-mold tuning chamber may not be equivalent to a volume of the second in-mold tuning chamber.

In any of the aspects or combinations of the aspects, the temperature of and/or the pressure applied to the first molten polymeric material may vary from the temperature of and/or the pressure applied to the second molten polymeric material.

In any of the aspects or combinations of the aspects, the first molten polymeric material may be included in a molten SPS having a blowing agent dissolved in the first molten polymeric material.

In any of the aspects or combinations of the aspects, the blowing agent may be a physical blowing agent.

In any of the aspects or combinations of the aspects, the physical blowing agent may be an SCF.

In any of the aspects or combinations of the aspects, in the filling position, the first in-mold tuning chamber may be engaged with an interior wall of the mold cavity and is in direct fluid communication with an outlet of the upstream device and where the upstream device is a runner.

In any of the aspects or combinations of the aspects, a blowing agent may be dissolved in the first molten polymeric material to create a first molten SPS.

In any of the aspects or combinations of the aspects, the molding system may further include a second in-mold tuning chamber configured to be arranged in a filling position and a withdrawn position, where in the filling position the second in-mold tuning chamber receives a second molten polymeric material from the upstream device and is positioned at least partially within the mold cavity.

In any of the aspects or combinations of the aspects, releasing the tuned molten polymeric material into the mold cavity may include breaking a seal between an interior wall of the mold cavity and a lip of the in-mold tuning chamber.

In any of the aspects or combinations of the aspects, actively adjusting the melt strength of the molten polymeric material may include increasing the melt strength of the molten polymeric material.

In any of the aspects or combinations of the aspects, a blowing agent may be dissolved in the molten polymeric material to form a molten SPS.

In any of the aspects or combinations of the aspects, where the article may have varying density gradients.

In any of the aspects or combinations of the aspects, the first tuned molten polymeric material and the second tuned molten polymeric material may be released into the mold cavity at different times.

In any of the aspects or combinations of the aspects, the temperature of and/or the pressure applied to the first molten polymeric material may vary from the temperature of and/or the pressure applied to the second molten polymeric material.

In any of the aspects or combinations of the aspects, the molding system may further include a polymeric material tuning assembly coupled to the first in-mold tuning chamber and configured to adjust the temperature of and/or the pressure applied to the molten polymeric material in the first in-mold tuning chamber.

In any of the aspects or combinations of the aspects, the polymeric material tuning assembly may include a moveable piston configured to adjust a volume of the first in-mold tuning chamber.

In any of the aspects or combinations of the aspects, the polymeric material tuning assembly may include a coolant loop traversing a housing of the first in-mold tuning chamber, a thermoelectric heater integrated within or coupled to the housing of the first in-mold tuning chamber, and/or a thermoelectric cooler integrated within or coupled to the housing of the first in-mold tuning chamber.

In any of the aspects or combinations of the aspects, the method may further include adjusting a pressure within the mold cavity via a gas counter pressure (GCP) assembly prior to and/or during the release of the first and second tuned molten polymeric materials from the first and second in-mold tuning chambers into the mold cavity.

In any of the aspects or combinations of the aspects, the method may further include adjusting a pressure within the mold cavity via a gas counter pressure (GCP) assembly prior to and/or during the release of the first tuned molten polymeric material from the first in-mold shot tuning chamber into the mold cavity.

Note that the example control and estimation routines included herein can be used with various system configurations. The control methods and routines disclosed herein may be stored as executable instructions in non-transitory memory and may be carried out by a molding system.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in a molding system, where the described actions are carried out by executing the instructions in the molding system including the various components.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a molding system, the method comprising:
   flowing a first molten polymeric material from an upstream device into a first in-mold tuning chamber in a filling position where the first in-mold tuning chamber is positioned at least partially within a mold cavity;
   adjusting at least one of a temperature of and a pressure applied to the first molten polymeric material in the first in-mold tuning chamber to create a first tuned molten polymeric material;
   removing the first in-mold tuning chamber from the mold cavity; and
   releasing the first tuned molten polymeric material into the mold cavity from the first in-mold tuning chamber.

2. The method of claim 1, where the step of adjusting at least one of the temperature of and the pressure applied to the first molten polymeric material is implemented prior to releasing the first tuned molten polymeric material into the mold cavity.

3. The method of claim 1, further comprising;
   flowing a second molten polymeric material into a second in-mold tuning chamber in a
   filling position where the second in-mold tuning chamber is at least partially within the mold cavity;
   adjusting at least one of a temperature of and a pressure applied to the second molten polymeric material in the second in-mold tuning chamber to create a second tuned molten polymeric material; and
   releasing the second tuned molten polymeric material into the mold cavity from the second in-mold tuning chamber.

4. The method of claim 3, where the first tuned molten polymeric material is released from the first in-mold tuning chamber into the mold cavity at a different time than the release of the second tuned molten polymeric material from the second in-mold tuning chamber into the mold cavity.

5. The method of claim 3, where a volume of the first in-mold tuning chamber is not equivalent to a volume of the second in-mold tuning chamber.

6. The method of claim 3, where the temperature of and/or the pressure applied to the first molten polymeric material varies from the temperature of and/or the pressure applied to the second molten polymeric material.

7. The method of claim 1, where the first molten polymeric material is included in a molten single phase solution (SPS) having a blowing agent dissolved therein.

8. The method claim 7, where the blowing agent is a physical blowing agent or a chemical blowing agent.

9. The method of claim 1, further comprising adjusting a pressure within the mold cavity via a gas counter pressure (GCP) assembly prior to and/or during the release of the first tuned molten polymeric material from the first in-mold shot tuning chamber into the mold cavity.

10. A method for operation of a molding system, the method comprising:
    actively adjusting a melt strength of a molten polymeric material in an in-mold tuning chamber by applying a controlled pressure to the molten polymeric material and/or actively adjusting a temperature of the molten polymeric material to generate a tuned molten polymeric material;
    releasing the tuned molten polymeric material into a mold cavity from the in-mold tuning chamber;
    removing the in-mold tuning chamber from the mold cavity; and
    cooling the tuned molten polymeric material in the mold cavity to form a molded article;
    where a blowing agent is dissolved in the molten polymeric material to form a molten single phase solution (SPS).

11. The method of claim 10, where releasing the tuned molten polymeric material into the mold cavity includes breaking a seal between an interior wall of the mold cavity and a lip of the in-mold tuning chamber.

12. The method of claim 10, where actively adjusting the melt strength of the molten polymeric material includes increasing the melt strength of the molten polymeric material.

13. A method for operation of a molding system, the method comprising:
    flowing a first molten polymeric material from an upstream device into a first in-mold tuning chamber in a filling position where the first in-mold tuning chamber is positioned at least partially within a mold cavity;
    adjusting at least one of a temperature of and a pressure applied to the first molten polymeric material in the first in-mold tuning chamber to create a first tuned molten polymeric material; and
    releasing the first tuned molten polymeric material into the mold cavity from the first in-mold tuning chamber, where releasing the first tuned molten polymeric material into the mold cavity includes actuating a chamber retraction device coupled to the first in-mold tuning chamber to break a seal between the first in-mold tuning chamber and an interior wall of the mold cavity.

* * * * *